(12) United States Patent
Komizo

(10) Patent No.: US 10,661,807 B2
(45) Date of Patent: May 26, 2020

(54) DRIVING EVALUATION SYSTEM AND PROGRAM

(71) Applicant: HONDA MOTOR CO., LTD., Minato-ku, Tokyo (JP)

(72) Inventor: Tomoya Komizo, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/299,200

(22) Filed: Mar. 12, 2019

(65) Prior Publication Data
US 2019/0291739 A1    Sep. 26, 2019

(30) Foreign Application Priority Data

Mar. 26, 2018   (JP) .................. 2018-058933

(51) Int. Cl.
*G08B 23/00* (2006.01)
*B60W 40/09* (2012.01)
*G06Q 40/08* (2012.01)
*G07C 5/00* (2006.01)

(52) U.S. Cl.
CPC ............. *B60W 40/09* (2013.01); *G06Q 40/08* (2013.01); *G07C 5/008* (2013.01)

(58) Field of Classification Search
CPC ........ B60W 40/09; G06Q 40/08; G07C 5/008

USPC .... 340/576, 517, 521, 535, 538; 701/28, 35, 701/36, 70
See application file for complete search history.

(56) References Cited

U.S. PATENT DOCUMENTS

| | | | |
|---|---|---|---|
| 8,010,283 B2 * | 8/2011 | Yoshida | G09B 9/052 340/995.17 |
| 2008/0255722 A1 * | 10/2008 | McClellan | B60R 25/102 701/31.4 |
| 2009/0287374 A1 * | 11/2009 | Kuramori | B60W 40/08 701/41 |

FOREIGN PATENT DOCUMENTS

JP    2015-203726    11/2015

* cited by examiner

*Primary Examiner* — Tai T Nguyen
(74) *Attorney, Agent, or Firm* — Amin, Turocy & Watson, LLP

(57) ABSTRACT

A driving evaluation system includes: a driving information acquisition unit that acquires driving information related to driving of a driver of a vehicle; a driving evaluation calculation unit that calculates a driving evaluation result obtained by evaluating the driving of the driver based on the driving information acquired by the driving information acquisition unit; a timing determination unit that determines a timing at which the driving evaluation result is output for each output destination; and an evaluation result output unit that outputs the driving evaluation result at the timing determined by the timing determination unit.

7 Claims, 19 Drawing Sheets

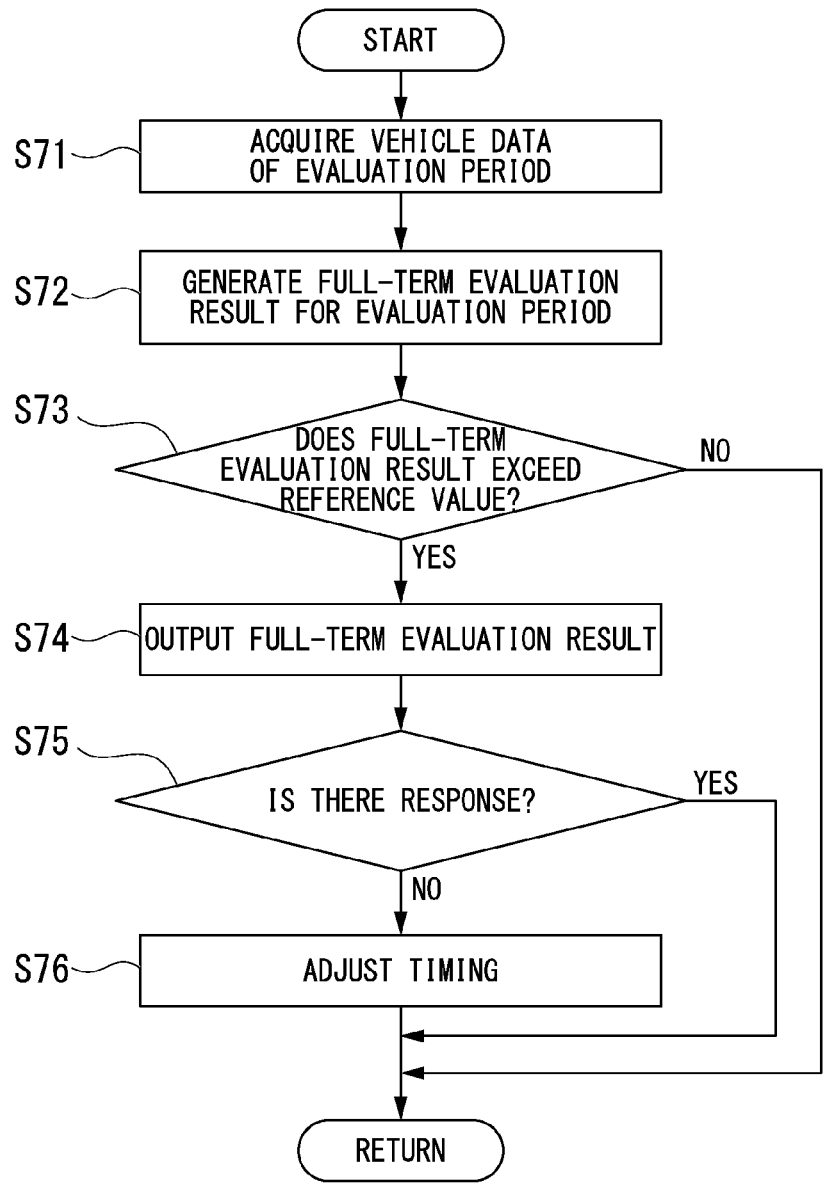

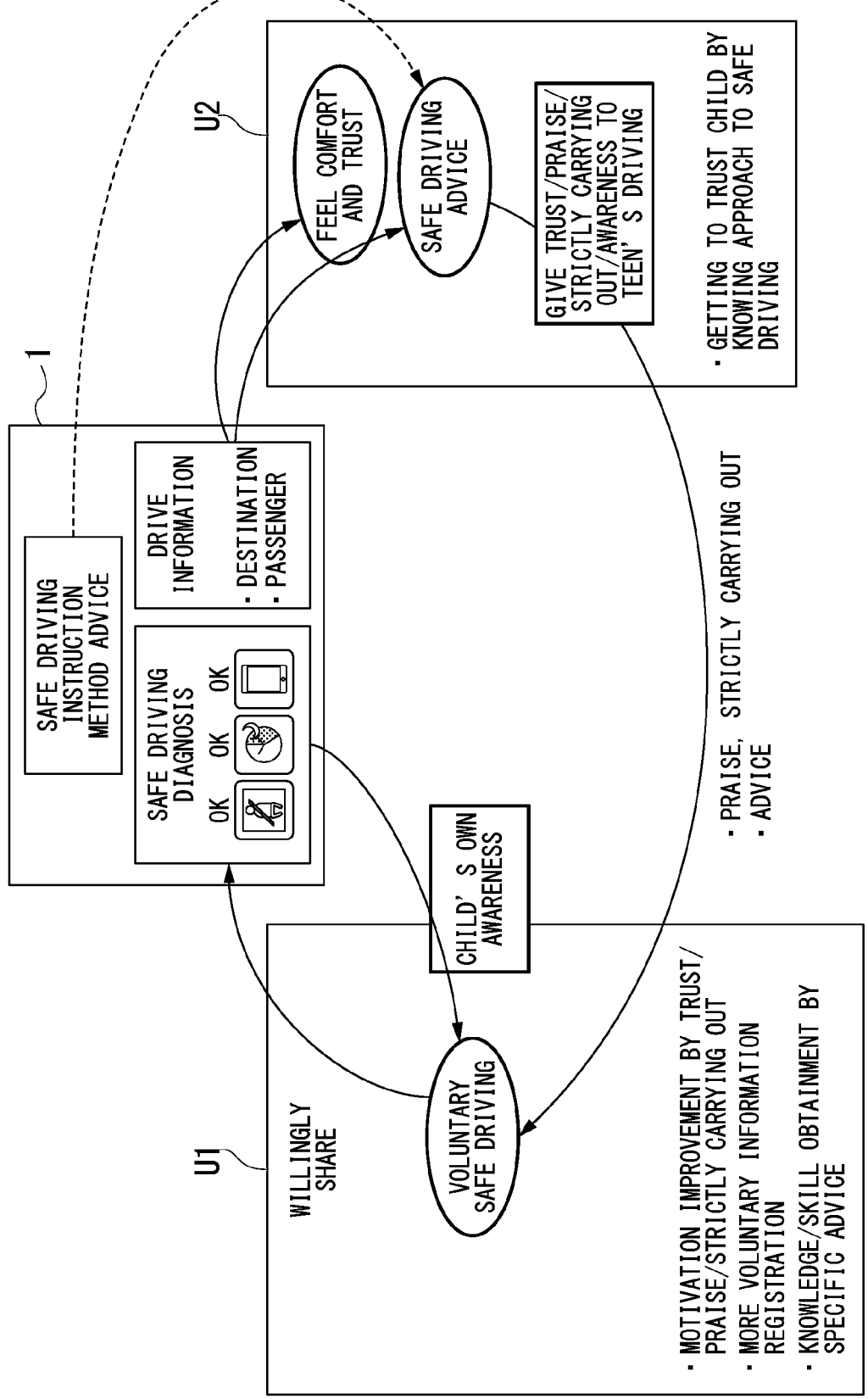

FIG. 13

```
START
  ↓
SERVER DEVICE TRANSMITS
FULL-TERM EVALUATION RESULT  — S171
  ↓
INSURANCE PREMIUM CALCULATION
DEVICE PERFORMS RESPONSE     — S172
  ↓
ACQUIRE FULL-TERM
EVALUATION RESULT            — S173
  ↓
DISPLAY FULL-TERM EVALUATION
RESULT ON DISPLAY UNIT       — S174
  ↓
ACQUIRE INFORMATION RELATED
TO INSURANCE PREMIUM         — S175
  ↓
GENERATE EVALUATION
RESULT IMAGE                 — S176
  ↓
OUTPUT EVALUATION RESULT
IMAGE ON DISPLAY UNIT        — S177
  ↓
RETRUN
```

FIG. 14

| | OUTPUT DESTINATION | | |
|---|---|---|---|
| | TERMINAL DEVICE 2 | TERMINAL DEVICE 8 | IN-VEHICLE EQUIPMENT 4 |
| RANK 1 | OUTPUT | OUTPUT | OUTPUT |
| RANK 2 | OUTPUT | — | OUTPUT |
| RANK 3 | — | OUTPUT | — |
| RANK 4 | OUTPUT | — | — |
| RANK 5 | — | — | — |
| ⋮ | ⋮ | ⋮ | ⋮ |

DRIVING EVALUATION SYSTEM AND PROGRAM

CROSS-REFERENCE TO RELATED APPLICATION

Priority is claimed on Japanese Patent Application No. 2018-058933, filed on Mar. 26, 2018, the contents of which are incorporated herein by reference.

BACKGROUND

Field of the Invention

The present invention relates to a driving evaluation system and a program.

Background

Skill related to driving of a vehicle gradually increases by repeated practice. A beginner at driving such as a young person sometimes notices missing skill in a case where the beginner is to be advised by a parent or an instructor (faculty) about his/her skill. When a beginner drives, it may be difficult for the parent or the instructor to always ride in a vehicle together with the beginner. Therefore, it is not easy for the beginner to be advised about his/her driving skill. On the other hand, a driving evaluation system for quantitatively evaluating driving skill is known (refer to Japanese Unexamined Patent Application, First Publication No. 2015-203726).

SUMMARY

Japanese Unexamined Patent Application, First Publication No. 2015-203726 describes that an evaluation result of a driving technique is derived from measured data at a time of driving related to a state of a motorcycle and the evaluation result is disclosed to a driver and an instructor; however, in the related art, an evaluation period is determined by an action and the like taken by the driver at the time of the driving. A timing at which the evaluation result is output may not be suitable in terms of using the evaluation result of the driving technique derived by the above-described technique for various purposes in some cases.

An object of an aspect of the present invention is to provide a driving evaluation system and a program capable of providing an evaluation result about driving skill of a driver of a vehicle at a suitable timing.

(1) A driving evaluation system according to an aspect of the present invention includes: a driving information acquisition unit that acquires driving information related to driving of a driver of a vehicle; a driving evaluation calculation unit that calculates a driving evaluation result obtained by evaluating the driving of the driver based on the driving information acquired by the driving information acquisition unit; a timing determination unit that determines a timing at which the driving evaluation result is output for each output destination; and an evaluation result output unit that outputs the driving evaluation result at the timing determined by the timing determination unit.

(2) In the driving evaluation system of (1) described above, the timing determination unit may determine a frequency at which the driving evaluation result is output based on whether or not the driving evaluation result exceeds a reference.

(3) In the driving evaluation system of (2) described above, in a case where the driving evaluation result is higher than a past driving evaluation result, the timing determination unit may increase the frequency as compared with a case where the driving evaluation result is lower than the past driving evaluation result.

(4) The driving evaluation system of (2) or (3) described above may further include a response acquisition unit that acquires a response to the output driving evaluation result, wherein, in a case where the response is not acquired, the timing determination unit may increase the frequency as compared with a case where the response is present.

(5) In the driving evaluation system of (1) to (4) described above, the timing determination unit may cause a first frequency at which the driving evaluation result is output to the driver of the vehicle and a second frequency at which the driving evaluation result is output to an output destination different from the driver of the vehicle to be different from each other.

(6) In the driving evaluation system of (5) described above, the timing determination unit may increase the first frequency to be higher than the second frequency.

(7) Another aspect of the present invention is a computer-readable non-transitory recording medium which includes a program that causes a computer to: acquire driving information related to driving of a driver of a vehicle; calculate a driving evaluation result obtained by evaluating the driving of the driver based on the acquired driving information; determine a timing at which the driving evaluation result is output for each output destination; and output the driving evaluation result at the determined timing.

According to the constitutions (1) to (7), it is possible to provide an evaluation result related to driving skill of the driver of the vehicle at a suitable timing.

BRIEF DESCRIPTION OF THE DRAWINGS

FIG. 6 is a flowchart showing an example of a flow of a process of outputting an evaluation result according to the first embodiment.

FIG. 8 is a diagram explaining the usefulness of the driving evaluation system according to the first embodiment.

FIG. 13 is a flowchart showing an example of a flow of a synthesis process of the evaluation result image according to the fourth embodiment.

FIG. 14 is a diagram explaining a condition for determining an output destination according to the fourth embodiment.

DESCRIPTION OF THE EMBODIMENTS

Hereinafter, a driving evaluation system and a program according to an embodiment will be described with reference to the drawings. In the following description of the embodiments, it is assumed that "based on at least either one or both of data A and data B generated directly or indirectly from the data A", "based on data including at least data A and data B different from data A due to a predetermined condition or the like", any combination of the above, and the like may be simply referred to as "based on data A" in some cases.

First Embodiment

Figure 1:
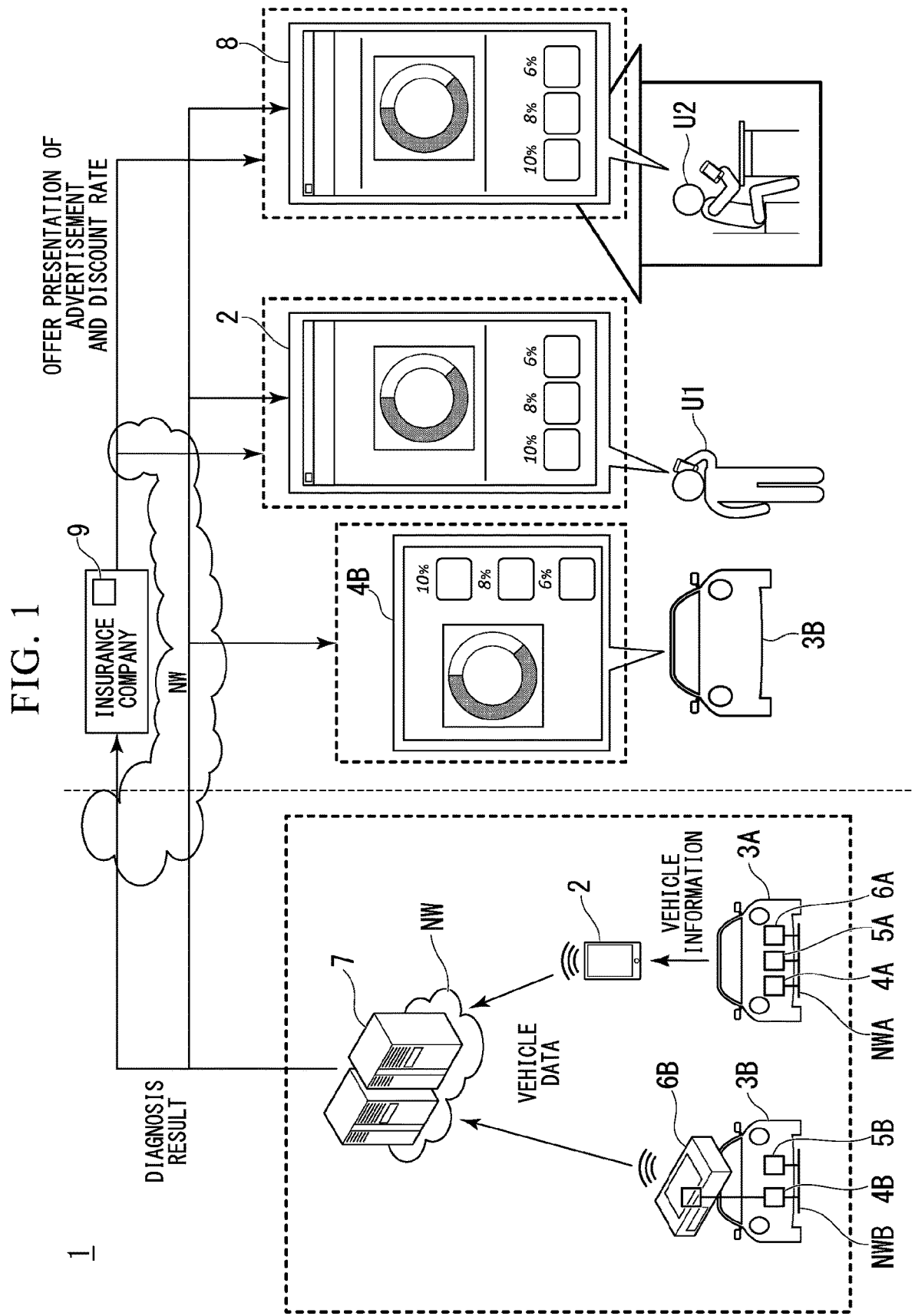
FIG. 1 is a constitution diagram of a driving evaluation system according to a first embodiment.

FIG. 1 is a constitution diagram of a driving evaluation system according to a first embodiment. FIG. 1 shows a plurality of vehicles related to the driving evaluation system 1, a server device 7, a second terminal device 8, and an insurance premium calculation device 9. The vehicle is, for example, a moving body (such as an automobile or a motorcycle) traveling on a road.

In-vehicle information equipment 4A, an electronic control unit (ECU) 5A, and a communication device 6A are mounted in a vehicle 3A. A first terminal device 2 is brought into the vehicle 3A by a user U1 at a time of driving.

The user U1 drives the vehicle 3A or a vehicle 3B. The user U1 is a beginner at driving, a person who is in a learning stage of driving skill, and the like. For example, the user U1 is a young person (child) and a user U2 is a parent of the user U1.

Hereinafter, the driving evaluation system according to the embodiment will be described separately in several case examples.

First, the driving evaluation system 1 according to the first embodiment will be described. The driving evaluation system 1 includes at least the first terminal device 2, the server device 7, and the second terminal device 8. The server device 7 described below is an example of a driving evaluation device.

The first terminal device 2 is a portable terminal device possessed by the user U1. The first terminal device 2 is, for example, a smartphone, a tablet terminal, or the like.

The in-vehicle information equipment 4A, the ECU 5A, and the communication device 6A are connected by a network NWA in the vehicle 3A. The in-vehicle information equipment 4A includes a display unit for displaying information to at least a passenger, and causes the display unit to display the information related to the vehicle 3A. The ECU 5A performs communication at an arbitrary timing and controls driving, braking, steering, and the like of the vehicle 3A. The communication device 6A transmits traveling information related to control information generated by the ECU 5A to the first terminal device 2 by communicating with the first terminal device 2. Here, it is assumed that the vehicle 3A is not provided with a functional unit that communicates with the server device 7, and it is assumed that the in-vehicle information equipment 4A is not included in the output destination of the present system.

The server device 7 is connected to the first terminal device 2, the second terminal device 8, a communication device 6B of the vehicle 3B that will be described later, and the like through the network NW and communicates with each of the devices. The server device 7 acquires data or the like indicating a driving situation of the vehicle provided from the first terminal device 2 or the communication device 6B, and outputs an evaluation result of the driving skill. Details thereof will be described later.

The second terminal device 8 is a terminal device operated by the user U2. A form of the second terminal device 8 is arbitrary, and may be portable or stationary. The user U2 browses information provided from the server device 7 and the like by operating the second terminal device 8.

[First Terminal Device 2]

Figure 2:
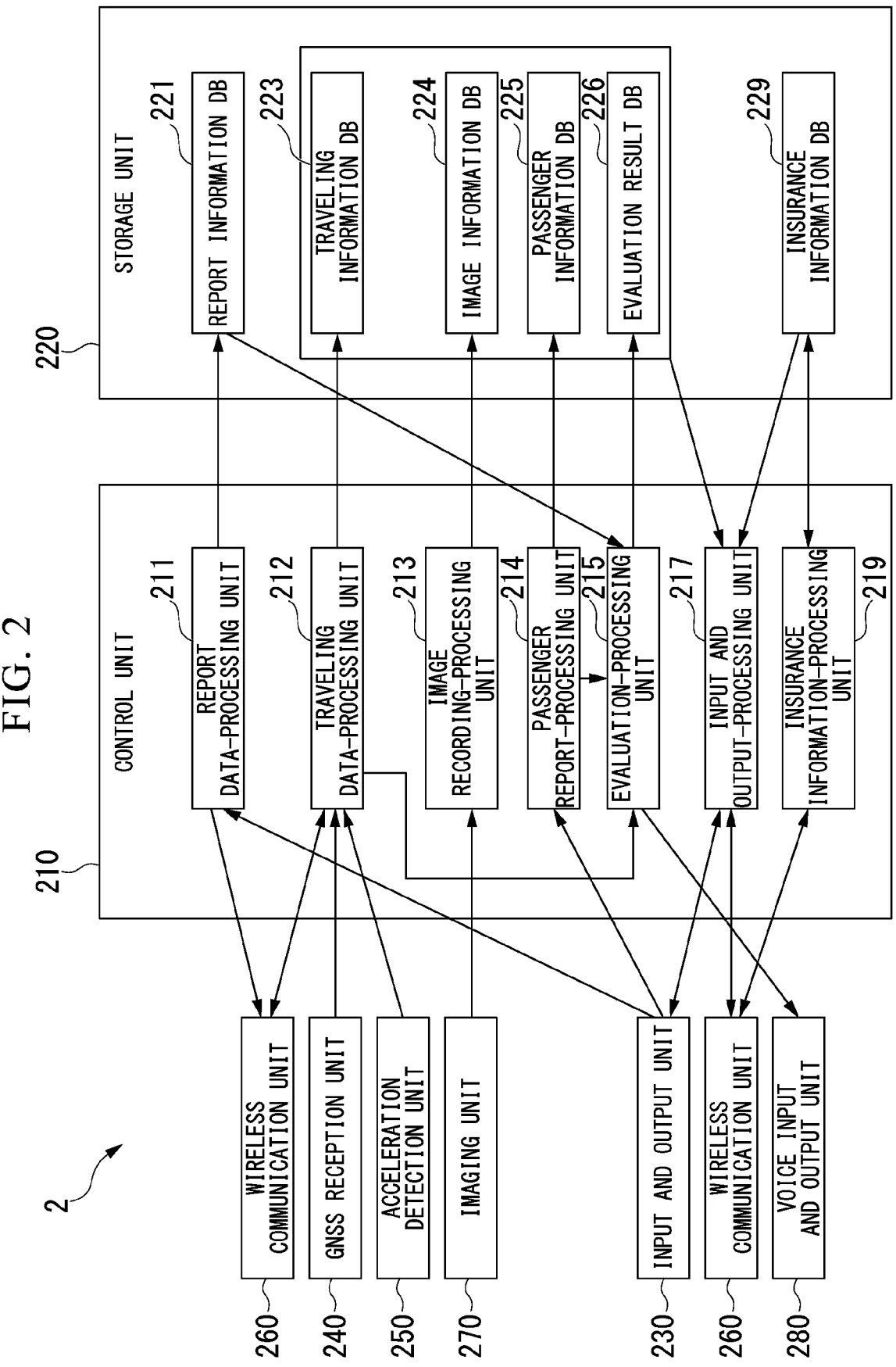
FIG. 2 is a constitution diagram of a terminal device according to the first embodiment.

FIG. 2 is a constitution diagram of a terminal device according to the first embodiment. The first terminal device 2 includes, for example, a control unit 210, a storage unit 220, an input and output unit 230, a GNSS reception unit 240, an acceleration detection unit 250, a wireless communication unit 260, an imaging unit 270, and a voice input and output unit 280.

The control unit 210 includes a processor or the like that executes a software program. The control unit 210 functions as a functional unit of various processes by executing the software program.

The storage unit 220 is realized by a read-only memory (ROM), a random-access memory (RAM), a hard disk drive (HDD), a flash memory, or the like. The software program executed by the processor may be stored in the storage unit 220 in advance, or may be downloaded from an external device, a portable storage medium, or the like, or through a communication line. The storage unit 220 stores various kinds of setting information for causing the first terminal device 2 to function as a communication terminal and a basic program such as an OS.

The input and output unit 230 includes a display unit (not shown) such as a liquid crystal display for displaying various kinds of information and an operation detection unit (not shown). The input and output unit 230 may be constituted as a touch panel.

The global navigation satellite system (GNSS) reception unit 240 receives a signal transmitted by a GNSS satellite, specifies a position of the GNSS reception unit on the basis of the received signal, and outputs information (hereinafter referred to as position information) indicating the position.

The acceleration detection unit 250 includes an acceleration sensor (or a gyro sensor) and detects a physical quantity such as an acceleration acting on the first terminal device 2.

The wireless communication unit 260 includes an antenna (not shown), and performs communication by a wireless communication method such as a cellular method or a wireless LAN method. The wireless communication unit 260 may further perform communication using a short-range wireless communication method such as Bluetooth (registered trademark).

The imaging unit 270 is, for example, a digital camera such as a charge-coupled device (CCD) camera or a complementary metal-oxide-semiconductor (CMOS) camera. Under the control of the control unit 210, the imaging unit 270 records an image around the vehicle 3A as a moving image or a semi-moving image, for example, while the user U1 is driving the vehicle 3A. The imaging unit 270 may be a body separate from a main body of the first terminal device 2.

The voice input and output unit 280 includes a microphone, a speaker, and the like which are not shown, and is used for, for example, in a telephone conversation. The voice input and output unit 280 may output a warning sound or the like from a speaker or the like under the control of the control unit 210.

The control unit 210 includes, for example, a report data-processing unit 211, a traveling data-processing unit 212 (driving information acquisition unit), an image storage-processing unit 213, a passenger report-processing unit 214, an evaluation-processing unit 215 (driving evaluation calculation unit).

The storage unit 220 stores, for example, a report information DB (database) 221, a traveling information DB 223, an image information DB 224, a passenger information DB 225, an evaluation result DB 226, an insurance information DB 229, and the like. The traveling information DB 223 and the image information DB 224 are an example of "information related to the driving situation". The traveling information DB 223, the image information DB 224, the passenger information DB 225, and the evaluation result DB 226 are an example of "vehicle data".

The report data-processing unit 211 acquires various kinds of report information registered by the user U1 operating the input and output unit 230, and adds the various kinds of report information to the report information DB 221.

For example, the various kinds of report information include attribute information of the user U1, output destination information related to the output destination of the evaluation result, range information indicating a range in which the driving of the vehicle 3A (or 3B) is allowed, speed limit information, and the like. For example, the output destination information includes a name of the user U1, contact destination information (for example, a mail address) of the user U1, a name of the user U2, contact destination information (for example, a mail address) of the user U2, timing information for each output destination, which indicates the timing at which the output is performed, and the like. The range information includes latitude and longitude information, identification information for designating a region, or the like. For example, a threshold value for determination is stored in the speed limit information. The report data-processing unit 211 transmits the acquired various kinds of information to the server device 7.

The traveling data-processing unit 212 generates traveling data indicating the driving situation of the vehicle 3A on the basis of various pieces of data acquired from the vehicle 3A through the wireless communication unit 260, and adds the traveling data to the traveling information DB 223. For example, the traveling information DB 223 includes items such as identification information of the vehicle 3A, a speed of the vehicle 3A, a rotational speed of an engine, date and time information at a time of traveling, position information of the vehicle 3A (position information of the GNSS reception unit 240, and the like), and acceleration information. For example, the traveling data-processing unit 212 adds acceleration information based on the acceleration and the like acting on the first terminal device 2, which is acquired from the acceleration detection unit 250 to the traveling information DB 223.

The image storage-processing unit 213 adds image data of the imaging unit 270 or a camera (not shown) mounted in the vehicle 3A to the image information DB 224. For example, the image data includes items such as the identification information of the vehicle 3A, the image information of the situation around the vehicle 3A, and the date and time information at the time of driving.

The passenger report-processing unit 214 acquires information related to the passenger registered by the user U1 operating the input and output unit 230, and adds the information related to the passenger to the passenger information DB 225. For example, the passenger information DB 225 includes items such as information related to the passenger (information related to whether or not a parent or an instructor having driving experience is on board) and a period during which the passenger is riding. For example, it is identified whether or not the parent or the instructor having driving experience is riding in the vehicle 3A by analyzing the information related to the passenger at the time of driving corresponding to a specified date and time.

The evaluation-processing unit 215 generates evaluation data indicating the evaluation result of an evaluation item related to the driving situation of the vehicle 3A on the basis of the various pieces of data acquired from each of the traveling data-processing unit 212 and the passenger report-processing unit 214, and adds the evaluation data to the evaluation result DB 226. As a method of evaluating the evaluation items described above, a known method may be used.

The evaluation result DB 226 includes a plurality of evaluation items. For example, the evaluation result DB 226 includes the identification information of the vehicle 3A and the evaluation result for each of the evaluation items (hereinafter simply referred to as the evaluation result). The evaluation items include, for example, history information of a specific event (sudden braking, rapid acceleration, or the like) and speeding, the date and time information at the time of traveling, a degree of concentration for strictly carrying out safe driving, the presence or absence of seat belt wearing, whether or not a person having abundant driving experience is on board, a time band of driving, the presence or absence of traveling outside a permissible driving range, and the like. The evaluation-processing unit 215 may specify the degree of concentration for strictly carrying out safe driving from a time of the telephone conversation using the first terminal device 2 during the driving, or the like.

For example, the evaluation-processing unit 215 acquires the range information reported by the user U1 from the report information DB 221, and determines the presence or absence of traveling outside the permissible driving range on the basis of the acquired range information. For example, the evaluation-processing unit 215 acquires a speed limit value that is set in advance from the report information DB 221, and determines speeding on the basis of the speed limit value. The report data-processing unit 211 may acquire the above-described speed limit value from the second terminal device 8 or the like and add the speed limit value to the report information DB 221. In this case, the report data-processing unit 211 may exclude a rewrite request from the first terminal device 2 with respect to the speed limit value.

The input and output-processing unit 217 transmits the above-described vehicle data to the server device 7 through the wireless communication unit 260, generates an image based on the vehicle data, and causes the input and output unit 230 to display the image.

The input and output-processing unit 217 receives the information provided from the server device 7 through the wireless communication unit 260 and causes the input and output unit 230 to display the information. The input and output-processing unit 217 transmits the information based on the operation of the user U1 detected by the input and output unit 230 to the server device 7 using the wireless communication unit 260.

When the input and output-processing unit 217 detects an event that is considered to be caused by a driver's forgetting or overlooking from the result detected by the evaluation-processing unit 215, the input and output-processing unit 217 may cause the input and output unit 230 to display an alerting indication or may cause the voice input and output unit 280 to output an alerting message or a warning sound.

An insurance information-processing unit 219 acquires information related to the insurance premium (the insurance premium related to the driving) of automobile insurance provided from an insurance company or the like through the wireless communication unit 260 and stores the information related to the insurance premium in the insurance information DB 229.

[Server Device 7]

Figure 3:
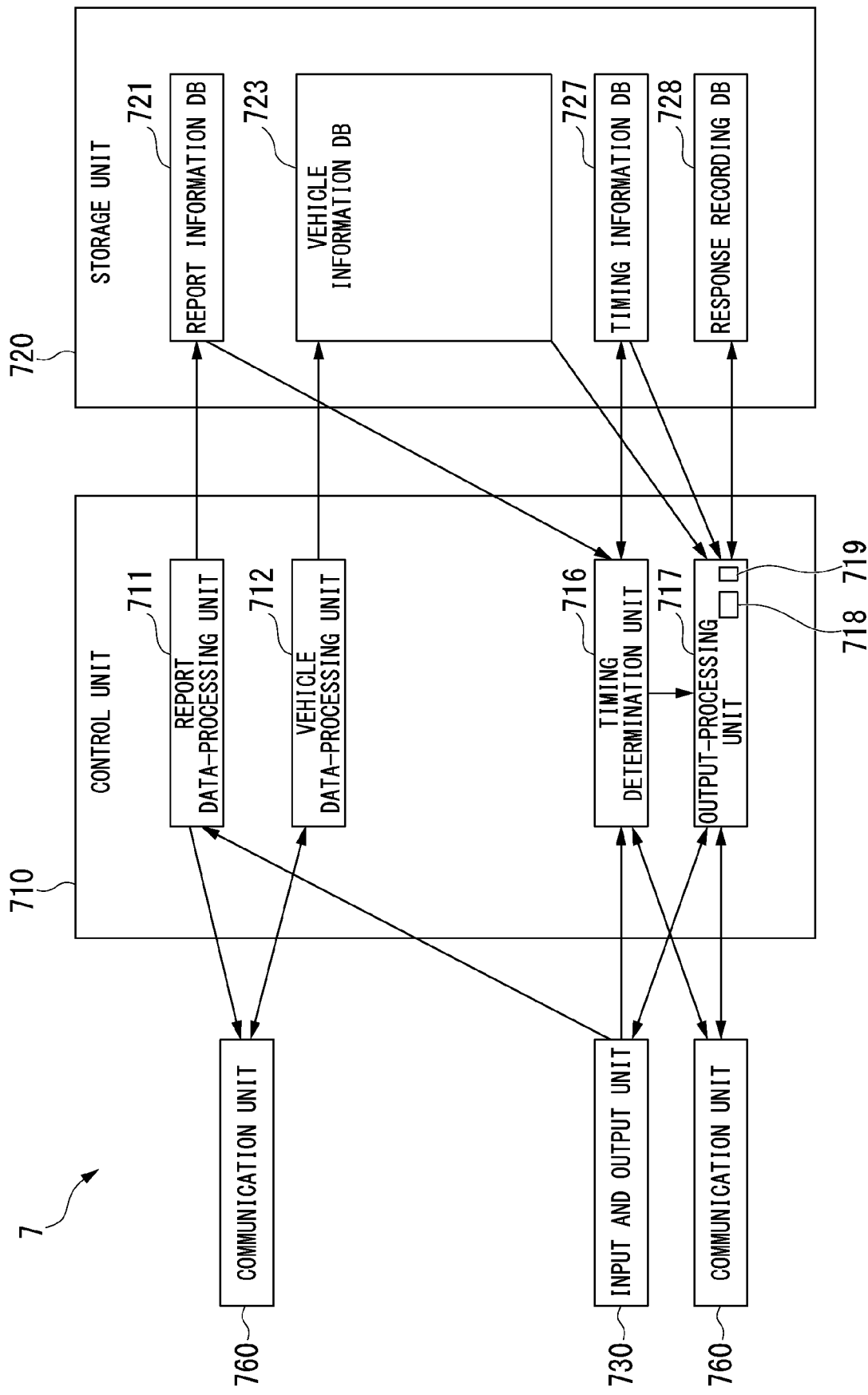
FIG. 3 is a constitution diagram of a server device according to the first embodiment.

Next, the server device according to the first embodiment will be described. FIG. 3 is a constitution diagram of the server device according to the first embodiment. The server device 7 includes, for example, a control unit 710, a storage unit 720, an input and output unit 730, and a communication unit 760.

The control unit 710 includes a processor or the like that executes a software program. The control unit 710 functions as a functional unit of various processes by executing the software program.

For example, the server device 7 may have functions of a web server, a database server, an authentication server, and the like.

The storage unit 720 is realized by a ROM, a RAM, an HDD, a flash memory, or the like. The software program executed by the processor may be stored in the storage unit 720 in advance, or may be downloaded from an external device, a portable storage medium, or the like, or through a communication line.

The storage unit 720 stores various kinds of setting information for causing the server device 7 to function as a processing device, and a basic program such as an OS. In addition to the above, the storage unit 720 stores various kinds of information and application programs for realizing a main function of the driving evaluation system 1.

The input and output unit 730 includes a display unit, a keyboard, and the like, which are not shown in the drawing. The input and output unit 730 receives an operation for the server device 7, notifies the control unit 710 of the operation, and displays a control state under the control from the control unit 710.

The communication unit 760 is connected to the network NW and communicates with each device through the network NW. For example, various types of generally known methods may be applied to a communication method with the network NW. For example, a position at which the server device 7 is physically disposed is not limited and the server device 7 is able to be appropriately selected as long as the server device 7 is able to perform communication through the network NW.

The control unit 710 of the server device 7 includes, for example, a report data-processing unit 711, a vehicle data-processing unit 712 (driving information acquisition unit), a timing determination unit 716, an output-processing unit 717 (driving evaluation calculation unit, evaluation result output unit). The output-processing unit 717 may include, for example, a response acquisition unit 718 and a point-processing unit 719. This will be described later.

The report data-processing unit 711 acquires various kinds of report information from the first terminal device 2 and adds the various kinds of report information to a report information DB 721.

The vehicle data-processing unit 712 acquires the vehicle data from the first terminal device 2 and adds the vehicle data to a vehicle information DB 723.

The storage unit 720 stores the report information DB 721, the vehicle information DB 723, a timing information DB 727, a response recording DB 728, and the like.

For example, the timing determination unit 716 determines a timing of outputting the evaluation result or the like on the basis of the timing information of each output destination included in the report information DB 721, and registers the result in the timing information DB 727 for each output destination. The data registered in the timing information DB 727 may be a value of a frequency related to the determined timing, and may include, for example, a value of a first frequency of a first output destination (the user U1), a value of a second frequency of a second output destination (the user U2), and the like. Hereinafter, the value of the frequency is simply referred to as a frequency.

Figure 4:
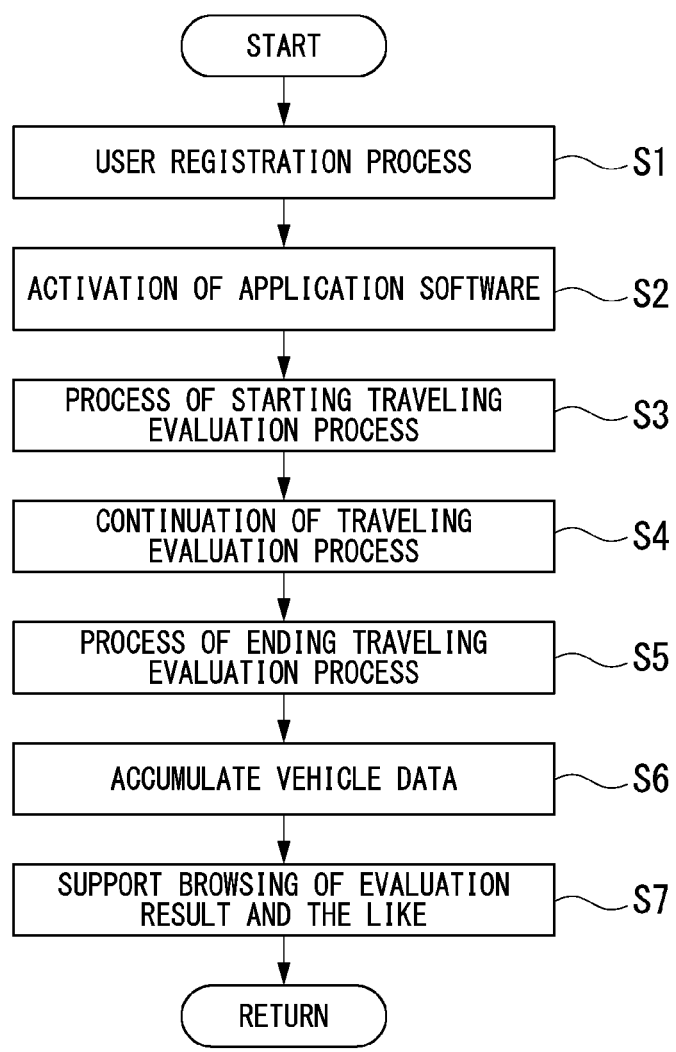
FIG. 4 is a flowchart showing an example of a flow of a process related to a driving evaluation according to the first embodiment.

Next, a flow of a process related to the driving evaluation according to the first embodiment will be described with reference to FIG. 4. FIG. 4 is a flowchart showing an example of the flow of the process related to the driving evaluation according to the first embodiment. The processes may be performed in parallel or an order of the processes may be changed within a range where there is no inconsistency in each of the processes. In order to simplify the description of the embodiment, an example in which the above-described processes is organized as a series of processes will be described.

First, the driving evaluation system 1 executes a user registration process in advance to obtain the information related to the user U1 (step S1). For example, the server device 7 of the driving evaluation system 1 determines the frequency of each output destination designated by the user U1 on the basis of the obtained information.

Next, the first terminal device 2 activates the application software by detecting the operation of the user U1 (step S2). Next, the control unit 210 of the first terminal device 2 executes a process of starting a traveling evaluation process (step S3). The traveling evaluation process includes an acquisition process and a recording process of information related to the driving situation, an evaluation process related to the evaluation items, a recording process in the storage unit of the evaluation result, and the like. Here, the acquisition process and the recording process of the information related to the driving situation among the above-described processes are started.

For example, the process of starting the traveling evaluation process is performed through a login process of the driving evaluation system 1 and detection of a driving start (Drive) button operation in a state in which an evaluation result image (FIG. 17) is displayed on the input and output unit 230. Such processes are executed before the user U1 starts driving the vehicle 3A. In accordance with the start of the traveling evaluation process, the input and output-processing unit 217 detects the operation of the driving start by the user U1, and starts the acquisition process and the recording process of the information related to the driving situation in the traveling evaluation process.

Next, the control unit 210 continues the above-described traveling evaluation process (the acquisition process and the recording process of the information related to the driving situation) (step S4). During this time, the user U1 drives the vehicle 3A. The operation of the first terminal device 2 during the driving, that is, the operation of the driving evaluation system 1 is unnecessary.

Next, the control unit 210 ends the traveling evaluation process by detecting the operation of the user U1 (step S5).

Figure 5:
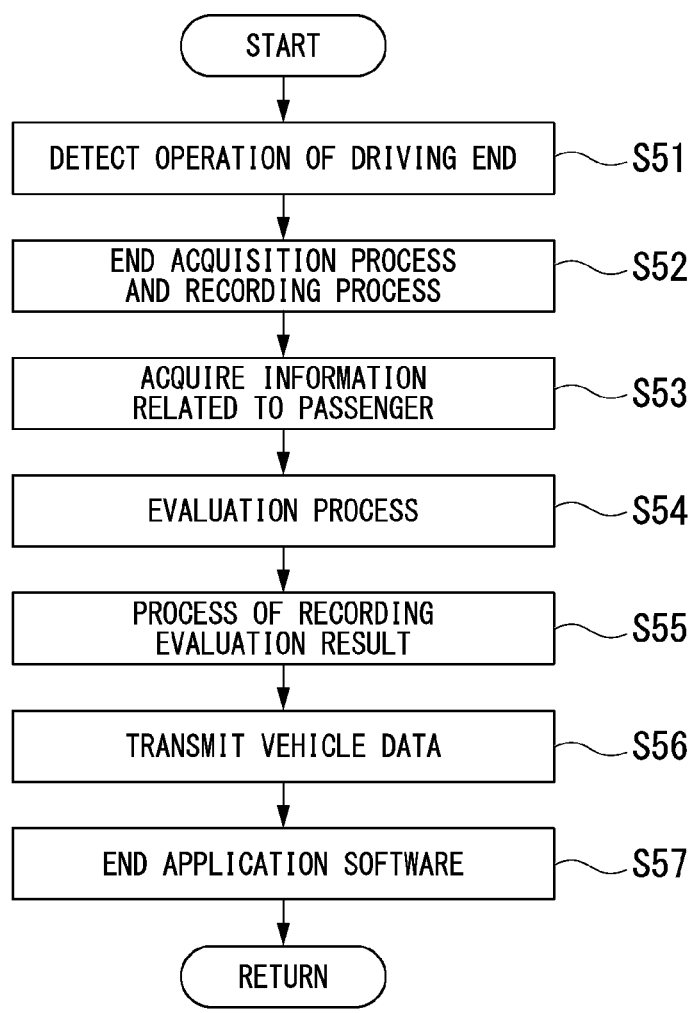
FIG. 5 is a flowchart showing an example of a flow of a process of ending a traveling evaluation process according to the first embodiment.

For example, the process of ending the traveling evaluation process is implemented in the following procedure. FIG. 5 is a flowchart showing an example of a flow of a process of ending the traveling evaluation process. First, the control unit 210 detects the operation of the driving end by the user U1 (step S51), and ends the continued acquisition process and the recording process of the information related to the driving situation (step S52). The passenger report-processing unit 214 of the control unit 210 acquires the information related to the passenger and registers the information related to the passenger in the passenger information DB (step S53). Thereafter, the evaluation-processing unit 215 of the control unit 210 executes the evaluation process related to the evaluation item (step S54), and executes the recording process in the storage unit of the evaluation result (step S55). Next, the input and output-processing unit 217 of the control unit 210 transmits the vehicle data including the evaluation result to the server device 7 (step S56). The control unit 210 ends the application software (step S57).

Returning to FIG. 4, next, the server device 7 acquires the vehicle data from the first terminal device 2 and registers the vehicle data in the vehicle information DB 723, thereby accumulating the vehicle data (step S6).

For example, each time the user U1 drives the vehicle 3A, the processes from step S2 to step S6 described above are repeated, and thus the vehicle data related to the driving evaluation of the user U1 is accumulated in the server device 7.

Next, the driving evaluation system 1 executes a process for supporting the browsing of the evaluation result and the like by the user U1 (step S7).

For example, the server device 7 transmits the evaluation result based on the vehicle data acquired from the first terminal device 2 and a full-term evaluation result based on the evaluation result of a predetermined period to the output destination at a predetermined timing that is set in advance to output the evaluation result and the full-term evaluation result at each output destination. The evaluation result and the full-term evaluation result are collectively referred to as the evaluation result. For example, the evaluation result and the like are distributed to the first terminal device 2 and the second terminal device 8 designated as the output destination, and thus browsing is permitted.

The predetermined period is, for example, a period from a previous output of the full-term evaluation result to a present output of the full-term evaluation result, which is an example of an evaluation target period. The evaluation target period is determined to be a length that includes one or more results of the driving. In a case where an evaluation target period of the first output destination is shorter than an evaluation target period of the second output destination, the first frequency of the first output destination (the user U1) is set to be higher than the second frequency of the second output destination (the user U2).

As described above, by determining the evaluation target period and calculating the full-term evaluation result, it is possible to obtain the full-term evaluation result in which the driving situation of at least a plurality of times is quantified.

After the driving end, the user U1 willingly refers to the evaluation result and the like related to the driving described above from the first terminal device 2 and checks the driving situation. Alternatively, the server device 7 outputs a guide prompting the checking of the evaluation result and the like to the first terminal device 2 at a predetermined timing defined by the first frequency, and supports the browsing of the evaluation result and the like by the user U1. For example, the user U1 may browse either one or both of the evaluation result and the full-term evaluation result related to the driving of the day after returning home or the like.

In a case where the user U2 receives a notification about the evaluation result or the like from the user U1, for example, in a case such as where the user U2 acquires one or both of the evaluation result and the like transmitted from the server device 7 at a predetermined timing defined by the second frequency and the guide prompting the checking of the evaluation result and the like, the user U2 may browse the information related to the evaluation result and the like output from the server device 7.

The server device 7 may send the full-term evaluation result to an insurance company by the report (designation) from the user U1 or U2. In a case where the full-term evaluation result is sent from the server device 7 to the insurance company, an offer (including fee, discount rate, and the like) on an insurance contract from the insurance company reaches one or both of the first terminal device 2 and the second terminal device 8. The users U1 and U2 are able to browse the content of the offer.

The offer on the insurance contract from the insurance company is changed according to the full-term evaluation result sent to the insurance company. The users U1 and U2 are able to estimate whether the full-term evaluation result is good or bad from the content of the offer.

Next, a process of the browsing support of the evaluation result and the like according to the first embodiment will be described.

The output-processing unit 717 of the server device 7 generates the full-term evaluation result of the evaluation target period on the basis of the vehicle data within the evaluation target period, among the vehicle data stored in the vehicle information DB 723 as a history of the driving, and outputs the full-term evaluation result to each output destination.

For example, in a case where the output-processing unit 717 outputs the full-term evaluation result to the first terminal device 2, the output-processing unit 717 outputs the full-term evaluation result at the first frequency F1. For example, an evaluation target period T1 in this case is determined so as to be within an interval of the first frequency F1. The first frequency F1 may be the same as or different from the first frequency of a case where one or both of the evaluation result and the like and the guidance for prompting the checking of the evaluation result from the server device 7 are transmitted.

In a case where the output-processing unit 717 outputs the full-term evaluation result to the second terminal device 8, the output-processing unit 717 outputs the full-term evaluation result at the second frequency F2. For example, an evaluation target period T2 in this case is determined by the second period T2 or the like defined by the second frequency F2. The second frequency F2 may be the same as or different from the second frequency of a case where one or both of the evaluation result and the like and the guidance for prompting the checking of the evaluation result from the server device 7 are transmitted.

The response acquisition unit 718 of the output-processing unit 717 may acquire a response (response) to the output of the full-term evaluation result and register the presence or absence of the response in the response recording DB 728.

In a case where the presence or absence of the response is registered, the timing determination unit 716 may determine the presence or absence of the response registered in the response recording DB 728 and adjust the frequency at which the full-term evaluation result is output. For example, in a case where there is no response, the timing determination unit 716 may use the presence or absence of the response registered in the response recording DB 728 to adjust the timing when outputting the full-term evaluation result to the output destination.

In a case where there is no response, the timing determination unit 716 adjusts the timing so that one or both of the first frequency and the second frequency is set to be higher than that or those of a case where there is the response. Therefore, it is possible to prompt the user U1 and the user U2 to view the evaluation result and the like.

The output-processing unit 717 may acquire information from the second terminal device 8, transmit the information to the first terminal device 2, and output the information to the input and output unit 230. For example, the output-processing unit 717 may acquire information written in a comment input column or the like associated with an image displayed on a side of the second terminal device 8, and may display the information on the input and output unit 230 of the first terminal device 2. Therefore, even though the user U1 and the user U2 do not face each other, the user U1 and the user U2 are able to interact with each other while adding words on the display or displaying a point corresponding to a topic, by displaying the same content on the first terminal device 2 and the second terminal device 8.

FIG. 6 is a flowchart showing an example of a flow of a process of outputting the evaluation result according to the first embodiment.

First, the output-processing unit 717 reads and acquires the vehicle data within the evaluation period from the vehicle information DB 723 (step S71).

Next, the output-processing unit 717 generates the full-term evaluation result corresponding to the evaluation target period on the basis of the vehicle data within the evaluation period (step S72).

Next, the timing determination unit 716 determines whether or not the full-term evaluation result exceeds a determination reference value (step S73). In a case where the full-term evaluation result does not exceed the determination reference value, the timing determination unit 716 ends the process shown in FIG. 6. In a case where the full-term evaluation result exceeds the determination reference value, the output-processing unit 717 outputs a result of the determination to an output destination that is set in advance (step S74).

Next, the timing determination unit 716 determines whether or not there is the response (step S75). In a case where there is the response, the timing determination unit 716 ends the process shown in FIG. 6. In a case where there is no response, the timing determination unit 716 adjusts the timing according to a predetermined rule (step S76), and ends the process shown in FIG. 6.

According to the process described above, the frequency of outputting the full-term evaluation result of a case where there is no response is higher than that of a case where there is the response. Among the processes described above, the full-term evaluation result may be output regardless of the determination result of step S73, and steps S75 and S76 may be omitted.

In a case where the full-term evaluation result by the vehicle data-processing unit 712 is relatively high as compared with a past full-term evaluation result, the timing determination unit 716 may increase the output frequency for notifying the guidance for checking the evaluation result and the like from the server device 7 more than that of a case where the full-term evaluation result is relatively low. Therefore, since the guidance of the evaluation result is notified at a high frequency in a case where the evaluation is improved, it is possible to increase the motivation of a person to be evaluated.

Figure 7A:
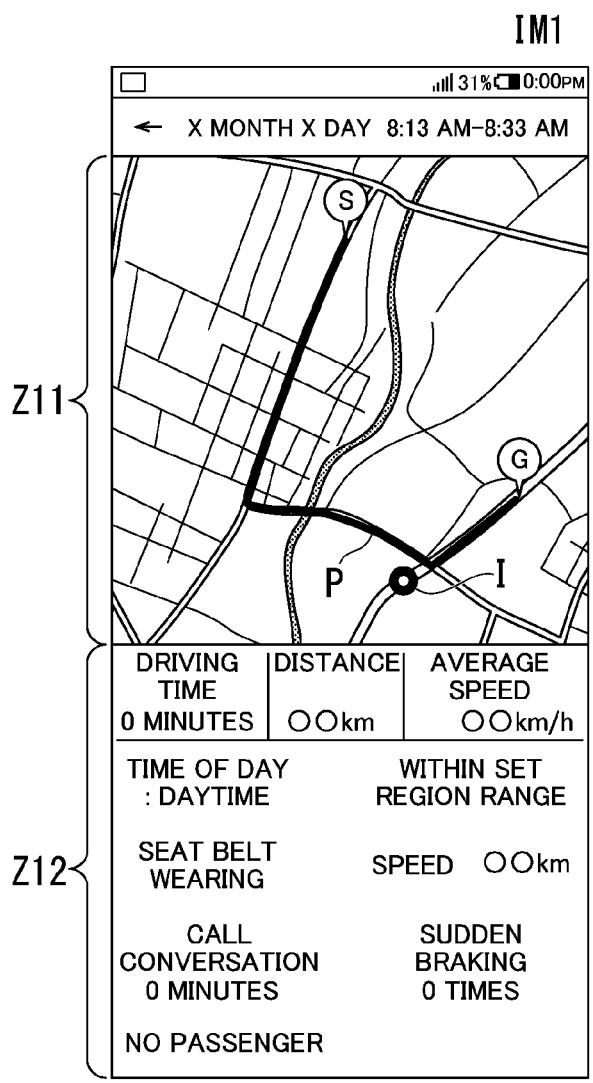
FIG. 7A is a diagram explaining an image showing an evaluation result according to the first embodiment.
Figure 7B:
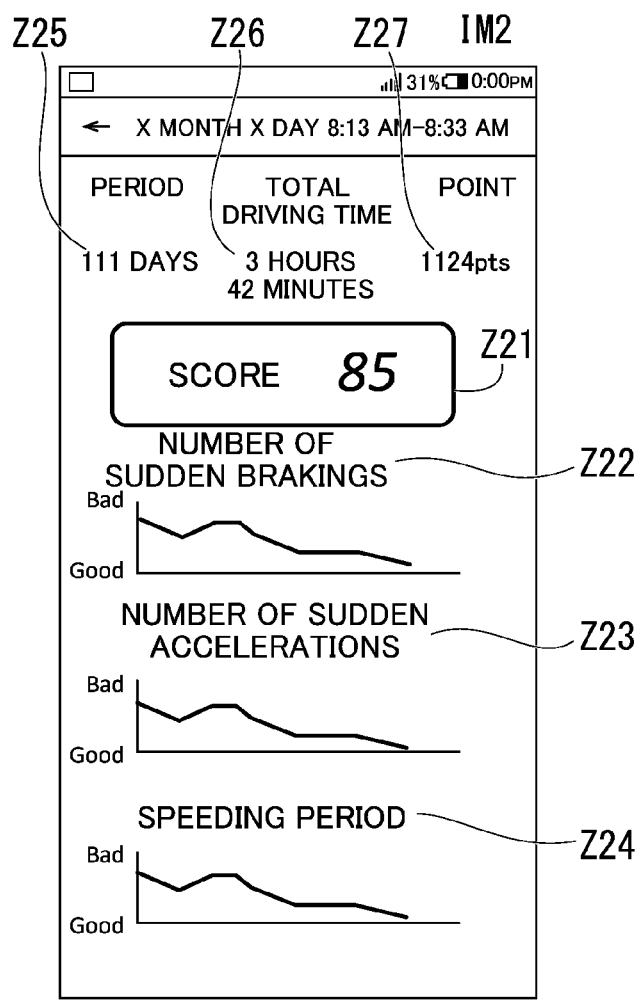
FIG. 7B is a diagram explaining an image showing the evaluation result according to the first embodiment.
Figure 7C:
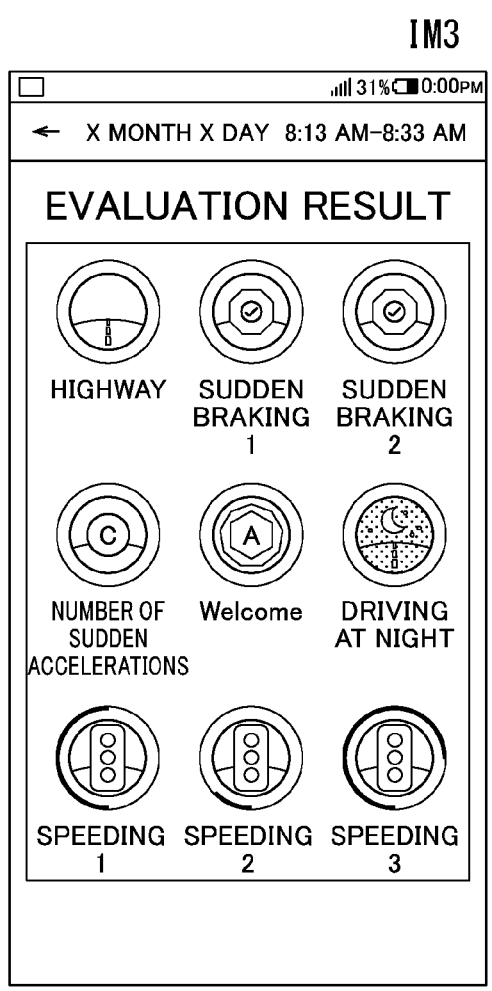
FIG. 7C is a diagram explaining an image showing the evaluation result according to the first embodiment.

Next, the display of the evaluation result will be described with reference to FIGS. 7A to 7C. FIGS. 7A to 7C are diagrams explaining an image showing the evaluation result according to the first embodiment.

An image IM1 shown in FIG. 7A is an example of an image in which a driving route is shown on a map Z11 and the evaluation result during driving of the driving route is also displayed. On the map Z11, a start point (step S) and a goal point (G) are shown, and a route (P) through which the vehicle travels from the start point to the goal point and a point (I) where an accident has occurred so far in a course of the route are displayed.

For example, the first terminal device 2 displays a display screen on the display unit at any time according to the operation of the user U1.

The server device 7 may transmit the display screen to the second terminal device 8 when a provision to the user U2 through the first terminal device 2 is designated and at a timing that is set in advance.

The user U2 is able to check the image IM1 only for those provided from the server device 7 to the second terminal device 8. For example, the output-processing unit 717 may select an output destination in accordance with a distribution condition or the like defined in the report information and output the information to an output destination to which distribution is permitted.

An image IM2 shown in FIG. 7B is an example of an image displaying the driving situation in a predetermined period. In this image, the evaluation target period, a total driving time, points, and the like are displayed. The points will be described later. Furthermore, as a result of the evaluation, a graph showing a history of a "score" (Z21) obtained by digitizing the evaluation result, the number of sudden brakings (Z22), the number of sudden accelerations (Z23), and a speeding period (Z24) is shown. This graph is an example of a case where each of the number of sudden brakings, the number of sudden accelerations, and the speeding period tends to decrease substantially with respect to an increase of the total driving time. Furthermore, in the image IM2, a plurality of evaluation target periods (Z25), a total driving time (Z26), points (Z27), and the like are displayed. The points will be described later.

An image IM3 shown in FIG. 7C is an example of an image obtained by modeling and displaying each evaluation result for each item of the evaluation result. In this image, icons corresponding to the items of the evaluation result are arranged in a grid pattern. In a case where a specific event occurs in the driving to be evaluated, for example, the output-processing unit 717 changes a display of an icon corresponding to the event from a display of a case where the event does not occur.

FIG. 8 is a diagram explaining the usefulness of the driving evaluation system 1 according to the first embodiment.

The user U1 uses the driving evaluation system 1 when driving the vehicle 3A (3B). The user U1 willingly drives safely while keeping it in mind, and willingly shares the information related to the driving using the first terminal device 2.

The first terminal device 2 provides the evaluation result of the driving of the user U1 on the basis of the shared information. The user U1 is aware of safe driving by analyzing the evaluation result by the user U1.

The first terminal device 2 provides the evaluation result of the driving of the user U1 to the second terminal device 8, for example, through the server device 7.

The user U2 receives the provision of the evaluation result to the second terminal device 8, and thus the user U2 is able to check that the user U1 is strictly carrying out safe driving and is able to feel comfortable and trust the user U1. On the other hand, in a case where there is a point to be improved in driving skill and the like, it is possible to give advice for safer driving to the user U1. Therefore, the user U2 may inform and praise the user U1 that the user U2 is able to trust the driving of the user U1 from the evaluation result, that the user U2 is able to confirm that the user U1 was strictly carrying out safe driving, and the like. In addition, the user U2 is able to act to give advice, suggestions, or autonomous awareness about the skill for safe driving, if necessary.

The users U1 and U2 are able to refer to an objectively diagnosed result individually or together, and by sharing the information such as the evaluation result related to the driving of the vehicle 3A, it is possible to facilitate communication between a parent and a child.

In addition, the user U1 confirms that he/she is aware that he/she was strictly carrying out safe driving, knows that he/she is trusted for driving, and receives praise. Therefore, the user U1 is confident in driving. Thus, the motivation for increasing the skill in the user U1 is further improved. In addition, the user U1 can acquire knowledge related to the skill by the advice, suggestions, and the like from the parent and increase the level of the driving skill.

According to the first embodiment described above, the server device 7 calculates the full-term evaluation result (driving evaluation result) related to the evaluation of the driving of the driver on the basis of the driving information related to the driving of the driver (the user U1) of the vehicle 3A, determines the timing of outputting the full-term evaluation result for each output destination on the basis of the output destination stored in the storage unit 720 that stores the information related to the output destination for outputting the full-term evaluation result, and outputs the full-term evaluation result according to the timing determined for each output destination. Therefore, it is possible to provide the full-term evaluation result on the driving skill of the driver of the vehicle 3A at a suitable timing. Furthermore, it is possible to perform moderate output according to the output destination.

By limiting a period during which the information is provided at the timing at which the server device 7 outputs the full-term evaluation result as described above, the users U1 and U2 are able to acquire the information including the necessary full-term evaluation result at a timing that is registered in advance.

The driving evaluation system 1 reduces the burden that the users U1 and U2 feel in acquiring the information described above. The driving evaluation system 1 contributes to promoting the use of the driving evaluation system 1 by providing the evaluation result and the like to the user U1, the user U2, and the like at a moderate frequency.

Second Embodiment

A second embodiment will be described. In the first embodiment, an example in which the first terminal device 2 is used within the vehicle 3A has been exemplified as the driving evaluation device. However, in the second embodiment, instead of the first terminal device 2, an example in which in-vehicle information equipment 4B mounted on in the vehicle 3B is used will be described.

As shown in FIG. 1 described above, the in-vehicle information equipment 4B and the ECU 5B are connected by the network NWB in the vehicle 3B. A communication device 6B is connected to the in-vehicle information equipment 4B.

The in-vehicle information equipment 4B communicates with the server device 7 through the communication device 6B through the network NW.

In the in-vehicle information equipment 4B, each functional unit for executing the traveling evaluation process instead of the first terminal device 2 according to the first embodiment is added to the in-vehicle information equipment 4A. The in-vehicle information equipment 4B displays various kinds of information related to the vehicle 3B on the display unit instead of the first terminal device 2.

The ECU 5B controls driving, braking, steering, and the like of the vehicle 3B.

The communication device 6B transmits the vehicle data related to the driving of the user U1 to the server device 7. That is, the communication device 6B functions as an interface for connecting the in-vehicle information equipment 4B to the network NW.

[In-Vehicle Information Equipment 4B]

Figure 9:
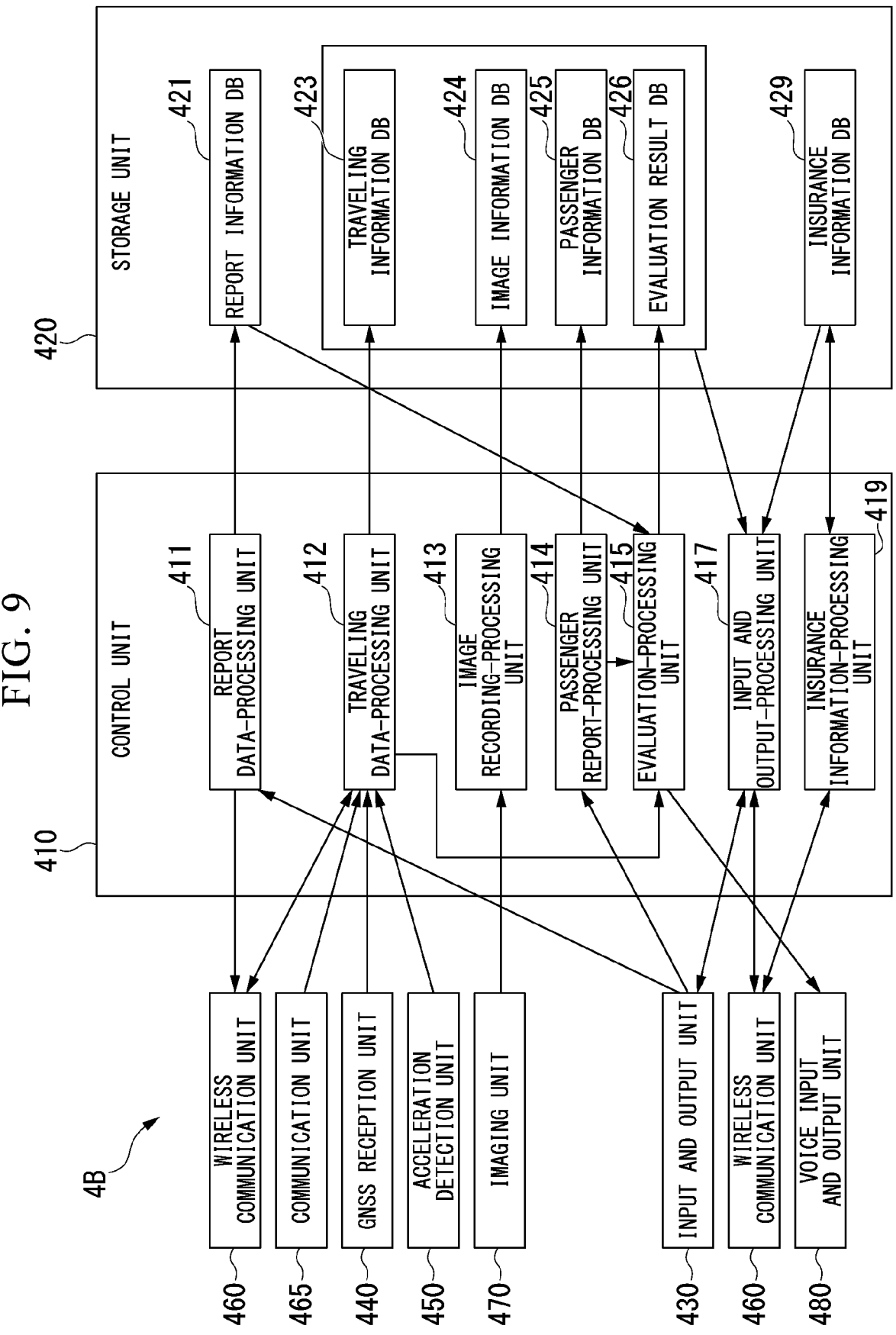
FIG. 9 is a constitution diagram of in-vehicle information equipment according to a second embodiment.

FIG. 9 is a constitution diagram of the in-vehicle information equipment according to the second embodiment. For example, the in-vehicle information equipment 4B includes a control unit 410, a storage unit 420, an input and output unit 430, a GNSS reception unit 440, an acceleration detection unit 450, a wireless communication unit 460, a communication unit 465, an imaging unit 470, and a voice input and output unit 480.

Each of the control unit 410, the storage unit 420, the input and output unit 430, the GNSS reception unit 440, the acceleration detection unit 450, the wireless communication unit 460, the imaging unit 470, and the voice input and output unit 480 has the same function as the control unit 210, the storage unit 220, the input and output unit 230, the GNSS reception unit 240, the acceleration detection unit 250, the wireless communication unit 260, the imaging unit 270, and the voice input and output unit 280 of the first terminal device 2.

The communication unit 465 communicates with the ECU 5B. The communication unit 465 collects traveling data and the like transmitted from the ECU 5B onto the network NWB.

The control unit 410 includes, for example, a report data-processing unit 411, a traveling data-processing unit 412, an image storage-processing unit 413, a passenger report-processing unit 414, an evaluation-processing unit 415, an input and output-processing unit 417, and an insurance information-processing unit 419. The report data-processing unit 411, the traveling data-processing unit 412, the image storage-processing unit 413, the passenger report-processing unit 414, the evaluation-processing unit 415, the input and output-processing unit 417, and the insurance information-processing unit 419 have the same function as the report data-processing unit 211, the traveling data-processing unit 212, the image storage-processing unit 213, the passenger report-processing unit 214, the evaluation-processing unit 215, the input and output-processing unit 217, and the insurance information-processing unit 219 of the first terminal device 2.

Detailed description will be omitted by replacing the following from the description of FIG. 2

In the vehicle 3B, a device operated by the user U1 is replaced with the in-vehicle information equipment 4B from the first terminal device 2. However, it is possible to reduce the operation of the user U1 by constituting as follows. For example, instead of operating the button displayed on the input and output unit 230 by the user U1 (at the start of driving) and (at the end of the driving), from among the traveling data acquired by the traveling data-processing unit 412, the driving start of the user U1 is detected by detecting that an operation (IG ON or the like) for permitting the generation of a thrust of the vehicle 3B is performed, and the driving end of the user U1 is detected by detecting that an operation (IG OFF or the like) for limiting the generation of the thrust of the vehicle 3B is performed. Therefore, the in-vehicle information equipment 4B is able to control the start and end of the traveling evaluation process, and it is possible to reduce the operation of the above-described button of the user U1.

Regarding the browsing of the evaluation result after the driving end, the user U1 may browse the evaluation result provided from the server device 7 by using an arbitrary terminal device registered in advance.

The server device 7 also executes the same process as the vehicle data transmitted from the first terminal device 2 with respect to the vehicle data transmitted from the in-vehicle information equipment 4B.

According to the second embodiment, the same effect as the first embodiment is obtained. In a case of the second embodiment, when the user U1 drives the vehicle 3B, the user U1 may board the vehicle 3B without carrying the first terminal device 2. The in-vehicle information equipment 4B functions as a driving evaluation device instead of the first terminal device 2.

Third Embodiment

A third embodiment will be described. In the first embodiment and the second embodiment, an example in which the server device 7 determines the timing of outputting the evaluation result is exemplified, but instead of this, in the third embodiment, an example in which the first terminal device 2 determines the timing of outputting the evaluation result will be described.

The above-described driving evaluation system 1 shown in FIG. 1 is replaced with a driving evaluation system 1C, the first terminal device 2 is replaced with a first terminal device 2C, and the server device 7 is replaced with a server device 7C. Hereinafter, in the driving evaluation system 1C, a case of the vehicle 3A will be described by way of example, but the same is also able to be applied to the vehicle 3B. The description here will be omitted.

[First Terminal Device 2C]

Figure 10:
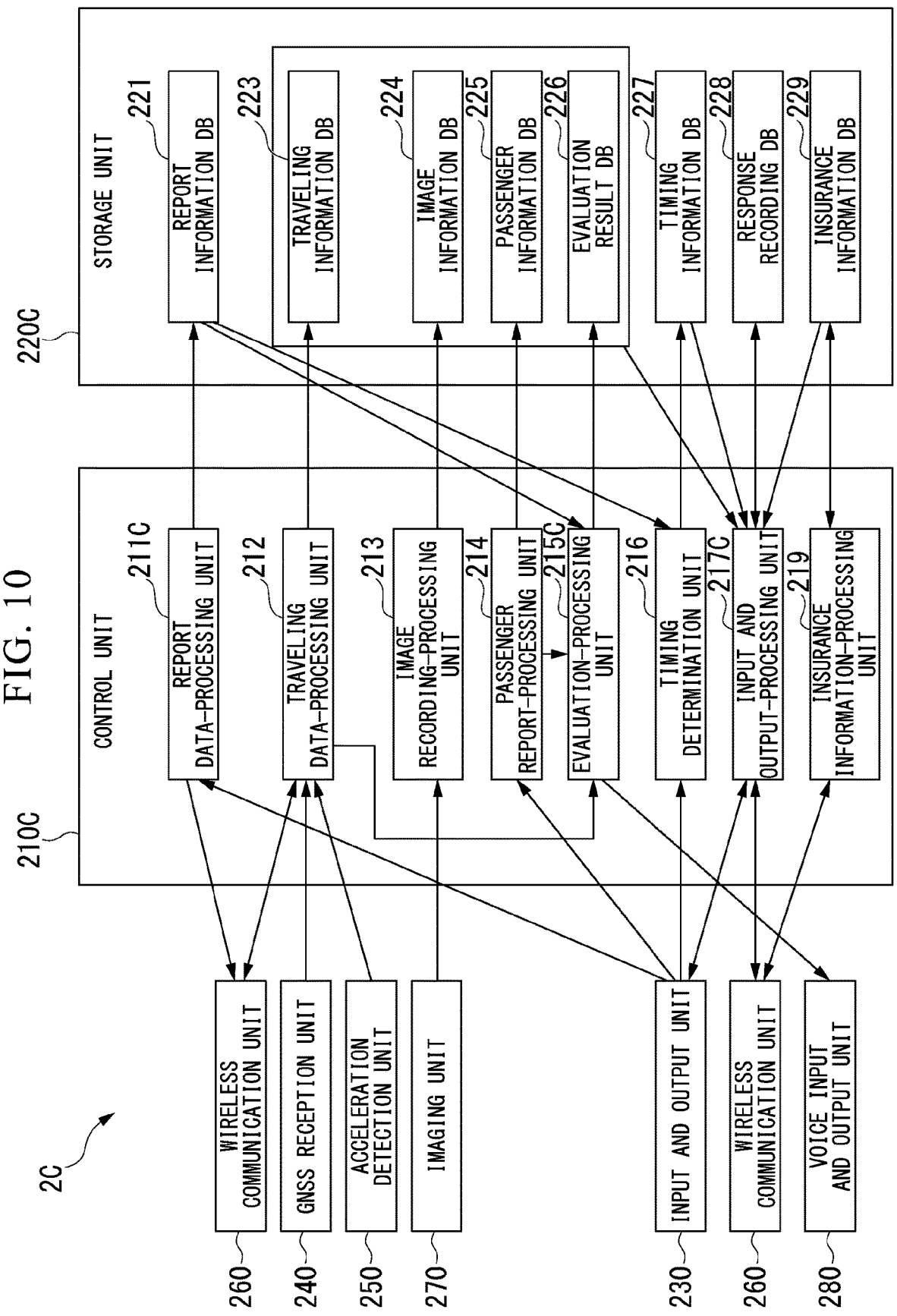
FIG. 10 is a constitution diagram of a terminal device according to a third embodiment.

First, the first terminal device 2C according to the third embodiment will be described. FIG. 10 is a constitution diagram of a terminal device according to the third embodiment.

For example, the first terminal device 2C includes a control unit 210C, a storage unit 220C, an input and output unit 230, the GNSS reception unit 240, the acceleration detection unit 250, the wireless communication unit 260, the imaging unit 270, and the voice input and output unit 280.

For example, the control unit 210C includes a report data-processing unit 211C, the traveling data-processing unit 212, the image storage-processing unit 213, a passenger report-processing unit 214, an evaluation-processing unit 215C (driving evaluation calculation unit), a timing determination unit 216, an input and output-processing unit 217C, and the insurance information-processing unit 219.

The storage unit 220C stores, for example, the report information DB 221, the traveling information DB 223, the image information DB 224, the passenger information DB 225, the evaluation result DB 226, a timing information DB 227, a response recording DB 228, the insurance information DB 229, and the like.

The report data-processing unit 211C is constituted by deleting the function of sending a part (timing information) of the acquired various kinds of information to the server device 7 from the function of the above-described report data-processing unit 211.

The evaluation-processing unit 215C is constituted by deleting "the function of transmitting the vehicle data to the server device 7 after evaluating the item related to the presence or absence of the passenger" from the function of the above-described evaluation-processing unit 215. That is, the first terminal device 2C does not transmit the vehicle data itself to the server device 7C.

The timing determination unit 216 and the timing information DB 227 are the same as the timing determination unit 716 and the timing information DB 727 described above. The timing determination unit 216 determines the timing of outputting the evaluation result for each output destination of the evaluation result and registers the timing in the timing information DB 227.

The input and output-processing unit 217C adds the following to the input and output-processing unit 217. In accordance with the timing registered in the timing information DB 727, the input and output-processing unit 217C outputs the evaluation result for each predetermined output destination.

[Server Device 7C]

Figure 11:
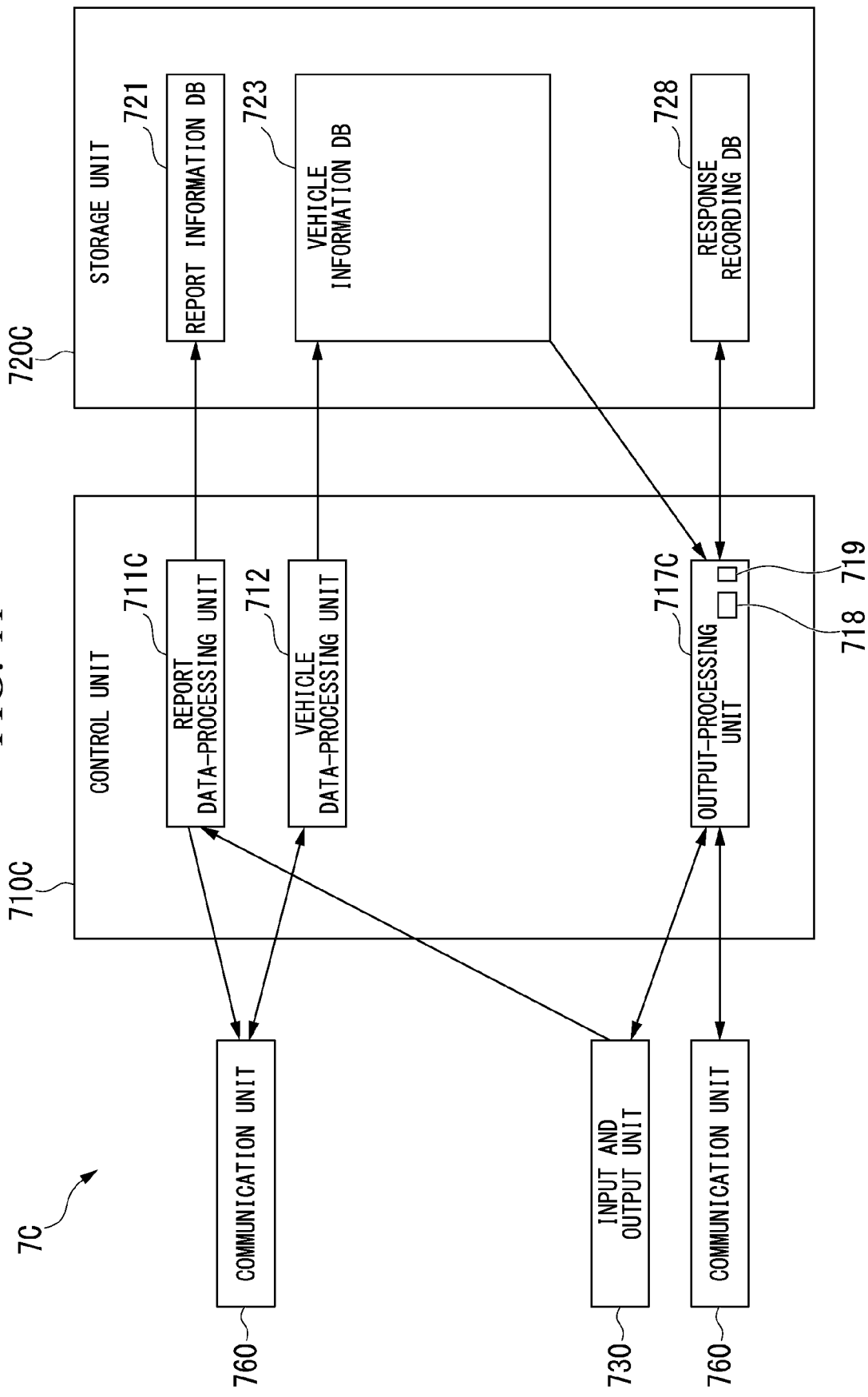
FIG. 11 is a constitution diagram of a server device according to the third embodiment.

Next, the server device according to the third embodiment will be described. FIG. 11 is a constitution diagram of the server device according to the third embodiment. The server device 7C includes, for example, a control unit 710C, a storage unit 720C, the input and output unit 730, and the communication unit 760.

In the server device 7C, the control unit 710C includes, for example, a report data-processing unit 711C, the vehicle data-processing unit 712, and an output-processing unit 717C. That is, in the control unit 710C, the timing determination unit 716 is deleted from the control unit 710.

The report data-processing unit 711C acquires various kinds of information reported by the operation of the first terminal device 2C or the like of the user U1 and adds the information to the report information DB 721.

The vehicle data-processing unit 712 acquires the vehicle data from the first terminal device 2 and adds the vehicle data to the vehicle information DB 723.

The storage unit 720C stores the report information DB 721, the vehicle information DB 723, and the like.

Next, an output process by the server device 7C will be described. The server device 7C is different from the server device 7 described above in that the server device 7C does not have the function of determining and adjusting the frequency and the timing related to the transmission to the output destination. Therefore, the server device 7C acquires the information transmitted from the first terminal device 2C or the like, and transmits the information to the output destination according to the timing at which the information is acquired.

In the third embodiment, the server device 7 may be replaced with a relay device such as a so-called router.

According to the third embodiment described above, it is possible to obtain the same effect as the first embodiment.

Fourth Embodiment

A fourth embodiment will be described. In the fourth embodiment, a function of displaying an offer (an advertisement, a discount rate, or the like) from the insurance company on the first terminal device 2 or the like is added to the driving evaluation system 1 or the like of the first to third embodiments.

An outline of the fourth embodiment will be described on the basis of the constitutions of the first embodiment and the second embodiment with reference to FIG. 1 described above. Note that the present invention is not limited thereto and may be applied to the constitution of the third embodiment.

The output destination from the server device 7 includes the insurance premium calculation device 9 of the insurance company. In a case where the full-term evaluation result satisfies a predetermined condition that is set in advance, the server device 7 transmits the full-term evaluation result to the insurance premium calculation device 9 of the insurance company. The predetermined condition is, for example, that a value indicated by the full-term evaluation result is a predetermined score (predetermined value) or more, that the full-term evaluation result is higher than results so far.

The insurance premium calculation device 9 acquires the full-term evaluation result, calculates a discount rate for a basic contract amount of the insurance contract, and transmits information for an offer of a recommended insurance contract to the output destination of the first terminal device 2 or the like. The information related to the offer of the recommended insurance contract includes, for example, a feature of the recommended insurance contract, a basic contract amount, a discount rate, an advertisement, and the like.

An example of the evaluation result image displayed on the terminal device or the like will be described with reference to FIG. 12.

Figure 12:
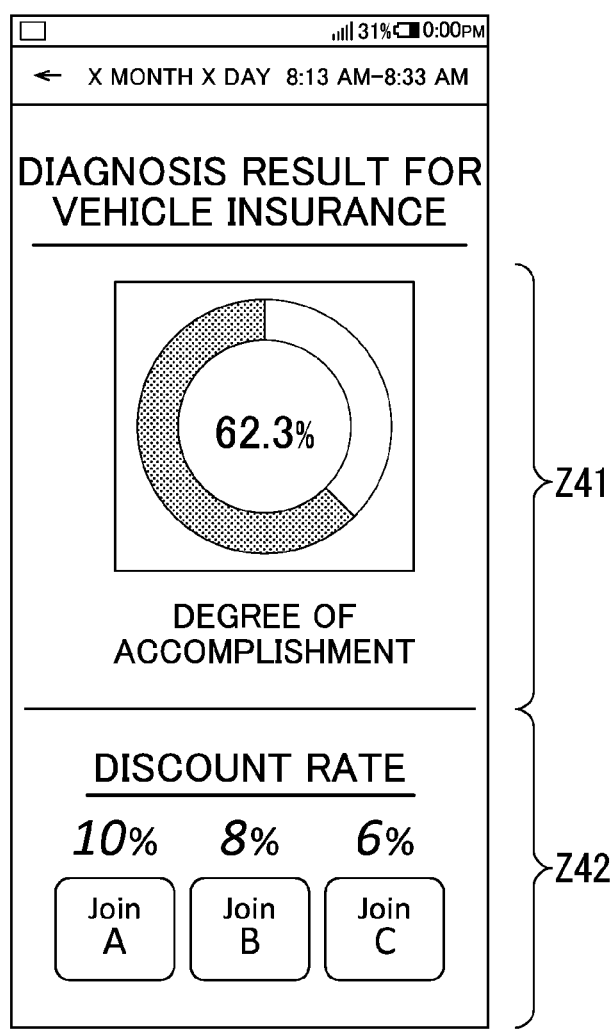
FIG. 12 is a diagram explaining an evaluation result image showing information related to an insurance contract according to a fourth embodiment.

FIG. 12 is a diagram explaining the evaluation result image showing the information related to the insurance contract according to the fourth embodiment. The full-term evaluation result is displayed as a pie chart on an upper side in an image IM4, the information related to the discount rate acquired from the insurance company is displayed on a lower side, and each of the full-term evaluation result and the information related to the discount rate is disposed so as to fit within the image IM4. The image IM4 is an example of the evaluation result image (information) for displaying the full-term evaluation result and the information related to the insurance contract on the same screen. In this example, it is shown that a discount rate of 10% is offered from insurance company A, a discount rate of 8% is offered from insurance company B, and a discount rate of 6% is offered from insurance company C. The discount rates described above are determined according to calculation standards of each of the insurance companies. For example, the above-described discount rate increases as the evaluation result of the driving of the contractor is good.

As described above, it is possible to compare and check the evaluation result and the discount rate of the insurance contract by displaying together the full-term evaluation result and the information related to the insurance contract.

For example, in a case where an expected discount rate is not satisfied, the user U1 notices that there is a possibility that the discount rate may increase in a case where the user U1 improves the item of which the evaluation value is low during the evaluation period.

As described above, in a case where the quantitative evaluation result is enhanced by keeping safe driving in mind daily, the discount rate of the insurance premium is further improved. The above-described discount rate of the insurance premium contributes to increasing the motivation for strictly carrying out safe driving.

Figure 15A:
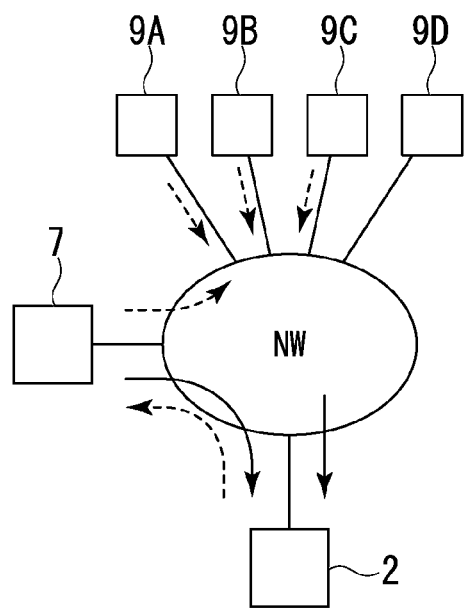
FIG. 15A is a diagram explaining a usage mode according to the fourth embodiment.

Referring to FIG. 13, a process of generating the evaluation result image will be described under an assumption that the server device 7 sends the full-term evaluation result to insurance premium calculation devices 9A to 9D of insurance companies (refer to FIG. 15A which will be described later). The insurance premium calculation devices 9A to 9D are provided in the insurance companies from the insurance companies A to D, respectively, and have the same function as the insurance premium calculation device 9 described above.

FIG. 13 is a flowchart showing an example of a flow of a synthesis process of the evaluation result image according to the fourth embodiment.

First, the server device 7 transmits a full-term evaluation result satisfying a predetermined condition that is set in advance to each of the insurance premium calculation devices 9A to 9D (step S171). In accordance with this, the server device 7 transmits the full-term evaluation result to the first terminal device 2 and the second terminal device 8 that satisfy a predetermined condition.

Next, the insurance premium calculation devices 9A to 9C respond to this full-term evaluation result (step S172).

Next, the input and output-processing unit 217 (driving evaluation acquisition unit) of the first terminal device 2 acquires the full-term evaluation result from the server device 7 (step S173). The full-term evaluation result is an example of the information obtained by digitizing the evaluation of the driving of the driver on the basis of the driving information related to the driving of the driver of the vehicle.

Next, the input and output-processing unit 217 (driving evaluation output unit) causes the input and output unit 230 to output the acquired full-term evaluation result (step S174).

Next, the insurance information-processing unit 219 acquires the information related to the insurance premium from each of the insurance premium calculation devices 9A to 9C (step S175) and registers the information related to the insurance premium in the insurance information DB 229.

Next, the input and output-processing unit 217 generates the image IM4 that is a combination of the full-term evaluation result and the information related to the insurance premium related to the driving of the vehicle 3A of each company on the basis of the full-term evaluation result and the information related to the insurance premium related to the driving of the vehicle 3A of each company (step S176), and causes the input and output unit 230 to output the image IM4 on the display unit (step S177).

FIG. 14 is a diagram explaining a condition for determining the output destination according to the fourth embodiment. With respect to each of a plurality of output destinations, information for determining whether or not output is permitted is stored in a table shown in FIG. 14. For example, this table is used to rank the driver's skills. Rank 1 indicates that the driving skill is proficient, and as a numerical value of the rank increases, the rank indicates that the amount of skill is less. This ranking may be replaced with the evaluation on the strict carrying out of safe driving.

For example, in a case where it is estimated as rank 1, all output destinations registered in this table are permitted as the distribution destination of the information related to the insurance premium.

In a case where it is determined to be rank 2, the first terminal device 2 (the user U1) and the in-vehicle information equipment 4 (4B) are permitted as the output destinations. In a case where it is determined to be rank 3, the second terminal device 8 (the user U2) is permitted as the output destination. In a case where it is determined to be rank 4, the first terminal device 2 is permitted as the output destination.

As described above, in a case where the full-term evaluation result does not satisfy the predetermined condition, the input and output-processing unit 217 is able to limit the distribution destination of the information related to the insurance premium by determining using the above-described table. For example, the server device 7 stores the table in the storage unit 720C.

For example, the user U2 may be part or all of an owner of the vehicle 3A, an automobile insurance policyholder of the vehicle 3A, and a holder of an insurance card of automobile insurance of the vehicle 3A.

For example, the server device 7 uniformly determines a method of limiting the distribution destination by the information related to the above-described table for each user.

In a case of individually setting, the first terminal device 2 may store the information related to the table in the report information DB 221, send the information related to the table to the server device 7 by including the information related to the table in the report information, and cause the server device 7 to select the output destination. The server device 7 transmits the output destination to the insurance premium calculation devices 9A to 9D. Therefore, the insurance premium calculation devices 9A to 9D are able to transmit the information related to the insurance premium only to the output destination notified from the server device 7.

As a more specific first example, in a case where the user U1 designates a table for setting any of rank 1 and rank 5 as a candidate for selection, when the full-term driving evaluation is less than the predetermined value, the server device 7 is able to designate that the information related to the insurance premium is not output to both the first terminal device 2 of the user U1 who is the driver and the second terminal device 8 of the user U2 who is the owner of the vehicle 3A (rank 5).

In addition, as a second example, in a case where the user U1 designates a table for setting any of rank 1 and rank 4 as the candidate for the selection, for example, when the full-term driving evaluation is less than the predetermined value, the server device 7 is able to designate that the information related to the insurance premium is output to the user U1 who is the driver and is not output to the user U2 who is the owner of the vehicle (rank 4).

Figure 15B:
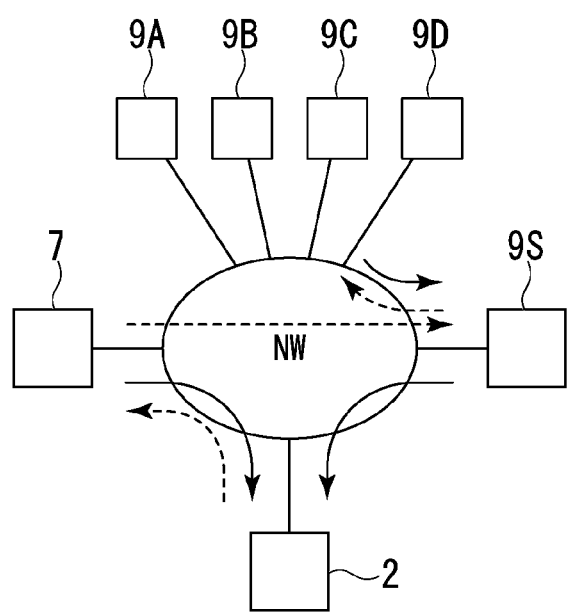
FIG. 15B is a diagram explaining the usage mode according to the fourth embodiment.
Figure 15C:
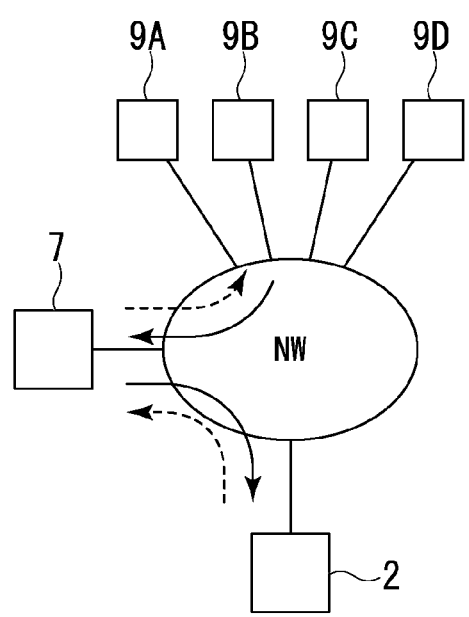
FIG. 15C is a diagram explaining the usage mode according to the fourth embodiment.

Next, a usage mode according to the fourth embodiment will be described with reference to FIGS. 15A to 15C. FIGS. 15A to 15C are diagrams explaining the usage mode according to the fourth embodiment. As shown in FIGS. 15A to 15C, the following several cases are considered as a constitution of an insurance company side.

Case 1: Usage mode in which the server device 7 sends the full-term evaluation result to the insurance premium calculation devices 9A to 9D of the respective insurance companies (FIG. 15A).

In case 1, the first terminal device 2 individually waits for a response from each of the insurance companies.

For detailed description thereof, refer to FIG. 13 described above.

Case 2: Usage mode in which the server device 7 sends the full-term evaluation result to an insurance premium calculation device 9S of an inquiry company that mediates the insurance company (FIG. 15B).

In case 2, in a case where the insurance premium calculation device 9S sends the full-term evaluation result to the insurance premium calculation devices 9A to 9D of the respective insurance companies, the insurance premium calculation device 9S acquires responses (the information related to the insurance premium) from the insurance premium calculation devices 9A to 9D, respectively. The insurance premium calculation device 9S gives a priority on the acquired information related to the insurance premium according to a predetermined condition and sends the information related to the insurance premium to the first terminal device 2 in a bundle. In this case, the first terminal device 2 is able to wait for the responses from each of the insurance companies at one time.

Case 3: A case where the server device 7 sends the full-term evaluation result to the insurance premium calculation devices 9A to 9D, and the server device 7 receives the responses from the insurance premium calculation devices 9A to 9D (FIG. 15C).

Figure 16:
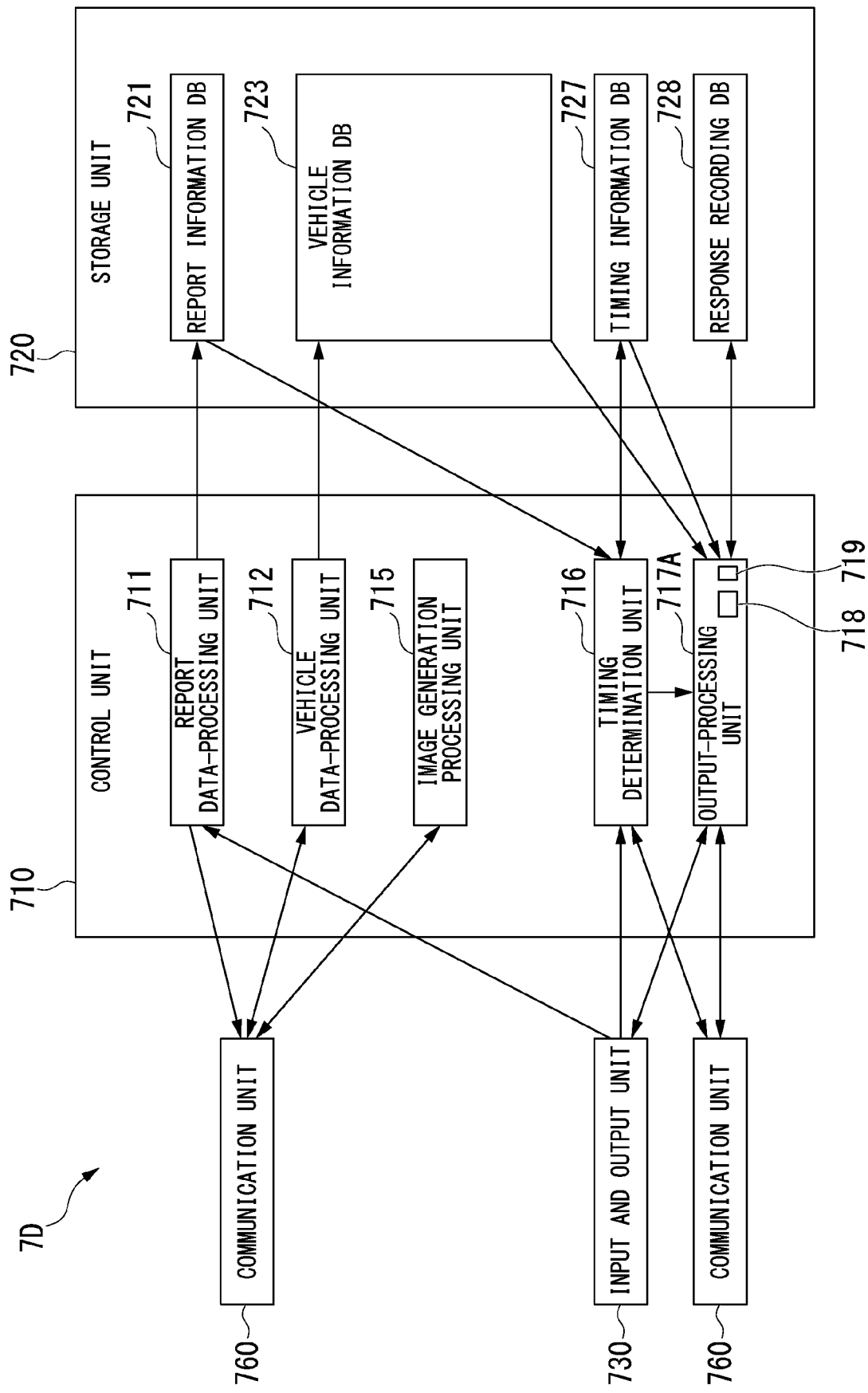
FIG. 16 is a constitution diagram of a server device applied to a modified example (Case 3) according to the fourth embodiment.

With respect to case 3, a server device 7D applied to case 3 will be described with reference to FIG. 16. FIG. 16 is a constitution diagram of the server device 7D applied to a modified example (Case 3) according to the fourth embodiment.

The server device 7D further includes an image generation-processing unit 715 with respect to the server device 7. The image generation-processing unit 715 generates the image IM4 instead of each terminal device or the like. The server device 7D distributes the image IM4 to each terminal device or the like.

For example, after the image generation-processing unit 715 receives the responses from the insurance premium calculation devices 9A to 9D, the image generation-processing unit 715 generates the image IM4 on the basis of the full-term evaluation result and the information related to the premium of each of the companies. An input and output-processing unit 717A transmits the generated image IM4 to the first terminal device 2 or the like that is permitted as the output destination. Each terminal device receives the image IM4 and displays the image IM4 on the display unit thereof.

The display image shown in FIG. 12 is an example and is not limited thereto. For example, in a case where the discount rate is notified from the insurance company, the first terminal device 2 may display all of the notified information in a list or may switch and display a part of the notified information. In this case, the user U1 can read a tendency of how the evaluation result of the user U1 is assessed from a tendency of the discount rate of each of the companies. As described above, in a case where the first terminal device 2 also displays even a case where the discount rate is relatively small, it contributes to the user U1 avoiding a driving by which the discount rate becomes small.

The first terminal device 2 may arrange the companies in descending order of the discount rates notified from each of the insurance companies and display some or all of the companies, and may arrange and display the companies in order of acquisition on the basis of all notified responses. In this case, the user U1 can read the tendency of how the evaluation result of the user U1 is assessed from the tendency of the discount rate of each of the companies.

The above-mentioned car insurance is sometimes referred to as a user-based insurance (UBI). The UBI includes a driving behavior interlocking type (pay how you drive (PHYD) and a traveling distance interlocking type (pay as you drive (PAYD). Although the automobile insurance exemplified in the above description relates to the former type of driving behavior interlocking type, it is not intended to limit an application of the latter type of driving distance interlocking type.

According to the fourth embodiment described above, in addition to the same effect as the first embodiment, the determination result of the insurance company as a result of determination of a third party is able to be used as the information for improving one's driving skill. Even though a determination standard of the insurance of the insurance company is concealed, according to the fourth embodiment, it is possible to obtain the result of the determination of the driving skill according to the determination standard.

Furthermore, according to the fourth embodiment described above, the full-term evaluation result evaluating the driving of the user U1 is acquired, the calculated driving evaluation result is output, and in a case where the calculated driving evaluation result satisfies a predetermined condition, the driving evaluation result and the information related to the insurance premium related to the driving are combined with each other and output. Therefore, in a case where the driving evaluation is high, the insurance premium or the discount rate of the insurance premium is presented together with the driving evaluation. Thus, the user U1 (the vehicle driver) and the user U2 (the owner of the vehicle) can easily recognize how the user U1 has been evaluated and it is possible to clearly present an enhancement point.

(Modified example of fourth embodiment) A modified example of the fourth embodiment will be described. The server device 7 according to the fourth embodiment transmits the full-term evaluation result satisfying a predetermined condition that is set in advance to the insurance premium calculation device 9 of the insurance company. Alternatively, the server device 7 of the modified example may also transmit a full-term evaluation result that does not satisfy the "predetermined condition" to the insurance premium calculation device 9 of the insurance company.

In this case, the first terminal device 2 implements the determination of the "predetermined condition". According to this, in a case where the predetermined condition is satisfied, the first terminal device 2 is able to generate the image IM4 and it is possible to obtain the same effect as the fourth embodiment.

Fifth Embodiment

A fifth embodiment will be described. In the fifth embodiment, a function of making use of points given by the present system to the contract with the insurance company shown in the fourth embodiment is added to the fourth embodiment.

The point use will be described with reference to FIG. 3 described above. The response acquisition unit 718 acquires the response of the user U2 who is the owner of the vehicle 3A to the full-term driving evaluation transmitted to the second terminal device 8 or the like.

In a case where the owner of the vehicle 3A acquires the response to the driving evaluation output from the input and output-processing unit 217, a point-processing unit 719 determines a point assignment rule so that the points are given to the owner of the vehicle 3A. For example, the above-described owner is able to use the points at a stage of newly signing up for automobile insurance. At that time, the points allocated by the point-processing unit 719 may be allocated to a part of the output insurance premium, and the premium may be set to be reduced by the points.

Finances of the points in this case may be borne by a company (insurance company or the like) that presented the insurance premium to any one or both of the users U1 and U2.

An insurance company is able to propose information related to an insurance service of the company and information related to a discount rate that will be advantageous to a policyholder as an owner who is keeping safe driving in mind. In a case where it is possible to contract with such an owner, it is possible to increase the number of customers who safely drive. Such an owner is assumed to be at a low risk of occurrence of payment due to an accident or the like. Therefore, even though a certain degree of discount is set, it is assumed that it will contribute to an increase in profit by increasing the number of contracts, and the insurance company is able to bear the finances of the points described above.

On the other hand, in a case where the driver of the vehicle 3A according to the above-described insurance contract keeps safe driving in mind daily, a possibility that the driver is involved in an accident becomes low. Furthermore, an insurance policyholder is able to benefit from strictly carrying out safe driving daily when contracting insurance and is able to sign up for insurance of similar service contents with an amount discounted from a standard contract amount or the like.

According to the fifth embodiment, in addition to obtaining the same effect as the first embodiment, it is possible to utilize the result of the daily safe driving by specifying the result of the daily safe driving as points.

Figure 17:
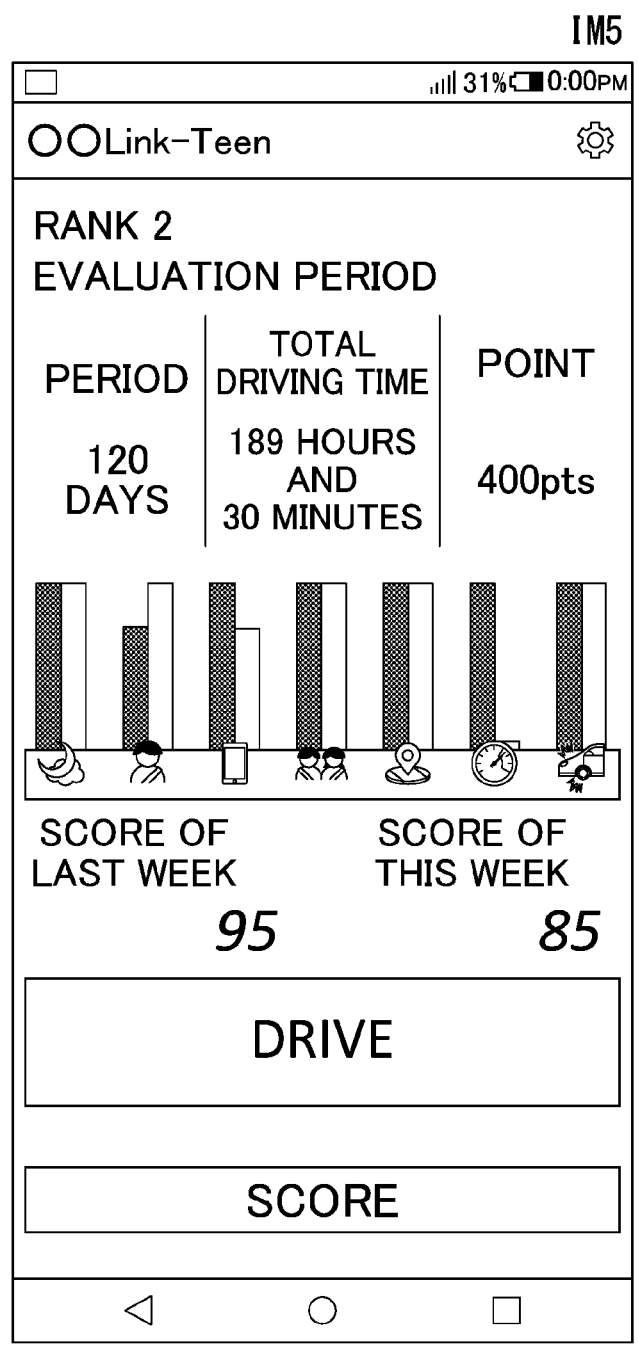
FIG. 17 is a diagram explaining an image showing an evaluation result according to the fourth embodiment.

Next, display of the evaluation result common to the each of the embodiments will be described with reference to FIG. 17. FIG. 17 is a diagram explaining an image showing the evaluation result according to the embodiment. The full-term evaluation result is displayed as a bar graph on an upper side of an image IM5, and a "DRIVE" button and a "score" button are displayed on a lower side. In the image IM5, a past evaluation result and a current evaluation result are displayed on the bar graph in contrast to each other.

The user U1 is able to read how the evaluation result has changed relative to the past evaluation result by causing the image IM5 to be displayed on the first terminal device 2. In addition, it is possible to start recording for the evaluation by operating the "DRIVE" button shown on the lower side.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A driving evaluation system, comprising:
   a driving information acquisition unit that acquires driving information related to driving of a driver of a vehicle;
   a driving evaluation calculation unit that calculates a driving evaluation result obtained by evaluating the driving of the driver based on the driving information acquired by the driving information acquisition unit;
   a timing determination unit that determines a timing at which the driving evaluation result is output for each output destination; and
   an evaluation result output unit that outputs the driving evaluation result at the timing determined by the timing determination unit.

2. The driving evaluation system according to claim 1, wherein the timing determination unit determines a frequency at which the driving evaluation result is output based on whether or not the driving evaluation result exceeds a reference.

3. The driving evaluation system according to claim 2, wherein, in a case where the driving evaluation result is higher than a past driving evaluation result, the timing determination unit increases the frequency as compared with a case where the driving evaluation result is lower than the past driving evaluation result.

4. The driving evaluation system according to claim 2, further comprising:
   a response acquisition unit that acquires a response to the output driving evaluation result,
   wherein, in a case where the response is not acquired, the timing determination unit increases the frequency as compared with a case where the response is present.

5. The driving evaluation system according to claim 1, wherein the timing determination unit causes a first frequency at which the driving evaluation result is output to the driver of the vehicle and a second frequency at which the driving evaluation result is output to an output destination different from the driver of the vehicle to be different from each other.

6. The driving evaluation system according to claim 5, wherein the timing determination unit increases the first frequency to be higher than the second frequency.

7. A computer-readable non-transitory recording medium comprising a program that causes a computer to:
   acquire driving information related to driving of a driver of a vehicle;
   calculate a driving evaluation result obtained by evaluating the driving of the driver based on the acquired driving information;
   determine a timing at which the driving evaluation result is output for each output destination; and
   output the driving evaluation result at the determined timing.

* * * * *